United States Patent [19]

Oono et al.

[11] Patent Number: 5,168,952
[45] Date of Patent: Dec. 8, 1992

[54] DRIVING WHEEL SLIP CONTROL SYSTEM FOR VEHICLES

[75] Inventors: Tetsuya Oono; Nobuyuki Narisawa; Yoshio Wazaki; Akira Kato; Eitetsu Akiyama; Hironobu Kiryu, all of Wako, Japan

[73] Assignee: Honda Giken Kogyo Kabushiki Kaisha, Tokyo, Japan

[21] Appl. No.: 505,075

[22] Filed: Apr. 5, 1990

Related U.S. Application Data

[63] Continuation-in-part of Ser. No. 198,815, May 25, 1988, abandoned.

[30] Foreign Application Priority Data

Jun. 11, 1987 [JP] Japan .................. 62-145920
Jun. 11, 1987 [JP] Japan .................. 62-145921
Jun. 11, 1987 [JP] Japan .................. 62-145922

[51] Int. Cl.⁵ ............................ B60K 28/16
[52] U.S. Cl. ..................... 180/197; 123/198 DB; 123/198 G; 123/481
[58] Field of Search .............. 180/197; 364/426.02, 364/426.01, 431.05, 431.06; 123/198 F, 481, 198 DB

[56] References Cited

U.S. PATENT DOCUMENTS

| | | | |
|---|---|---|---|
| 4,432,430 | 2/1984 | Lind et al. | 180/197 |
| 4,706,771 | 11/1987 | Kawabe et al. | 180/142 |
| 4,736,728 | 4/1988 | Takahashi et al. | 180/197 |
| 4,921,064 | 5/1990 | Wazaki et al. | 180/197 |
| 4,951,773 | 8/1990 | Poirier et al. | 123/481 |

FOREIGN PATENT DOCUMENTS 0150856 8/1985 European Pat. Off. .
0236947 11/1987 European Pat. Off. .
2158270 11/1985 United Kingdom ........... 180/197

OTHER PUBLICATIONS

Patent Abstracts of Japan—Publication No. 60124571, vol. 9, No. 282, (Kayaba Kogyo KK).
Patent Abstracts of Japan—Publication No. 62261575, vol. 12, No. 141, (Toyota Motor Corp.).

*Primary Examiner*—Mitchell J. Hill
*Attorney, Agent, or Firm*—Armstrong, Nikaido, Marmelstein, Kubovcik & Murray

[57] ABSTRACT

A driving wheel slip control system for a vehicle detects an excessive slip state of at least one of the driving wheels of the vehicle and reduces engine output when the excessive slip state is detected, by repeating alternate fuel cut and fuel supply such that fuel supply is stopped for a first predetermined time period, and a second predetermined time period. During the second predetermined time period the engine is supplied with an amount of fuel smaller than one required for an operating condition of the engine in the excessive slip state. If the excessive slip state has a greater variation in magnitude than a certain value, fuel supply is continuously effected for a third predetermined time period longer than the first predetermined time period or all the time during the excessive slip state. In another embodiment, slip value is determined which corresponds to the degree of an excessive slip of the driving wheel and a supply controller controls the amount of fuel supplied to various engine cylinders depending on the slip value. A fuel cut-off control cuts off the fuel supply to the various cylinders the number of which depends on the slip value when the slip value exceeds a predetermined slip value.

32 Claims, 20 Drawing Sheets

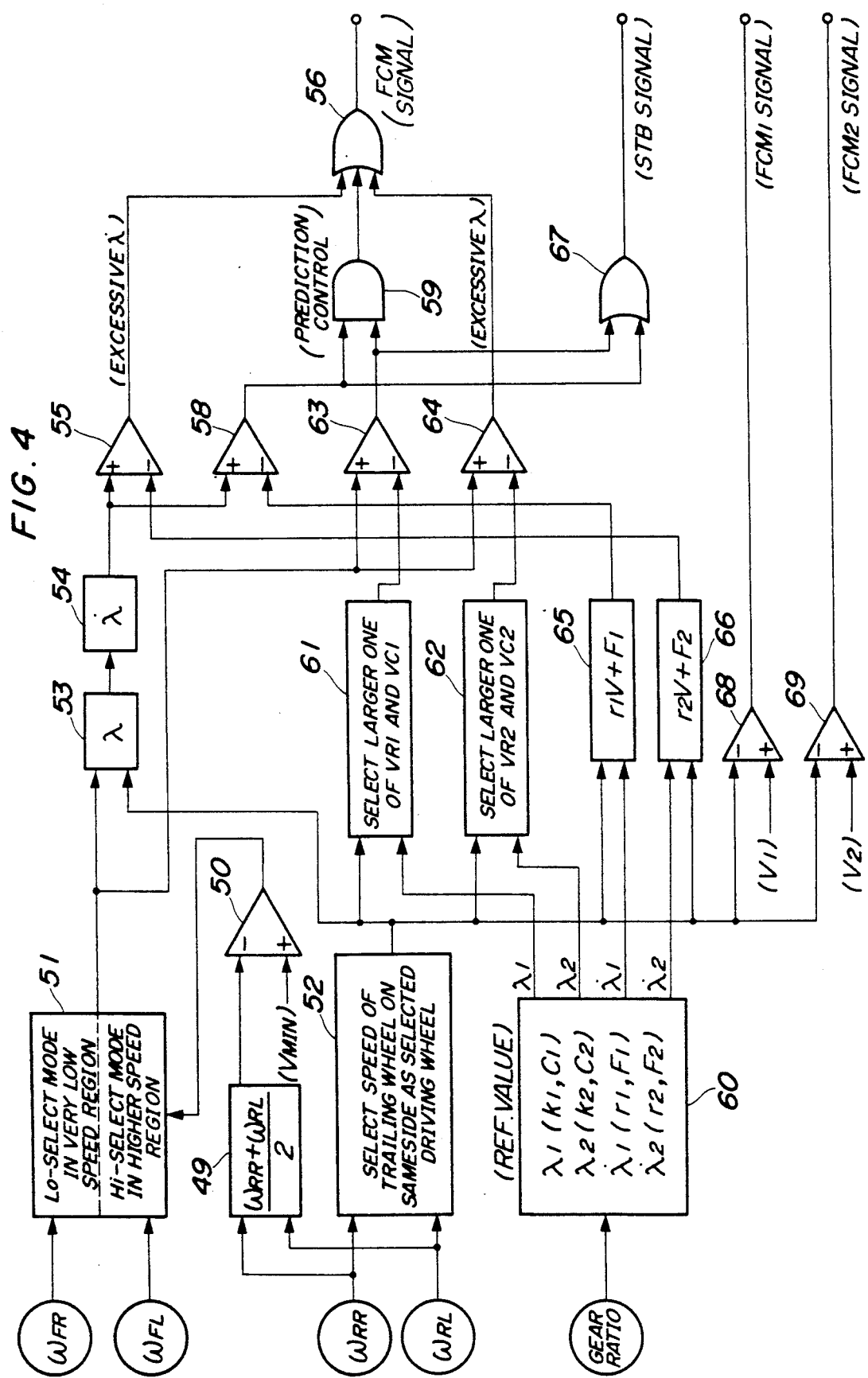

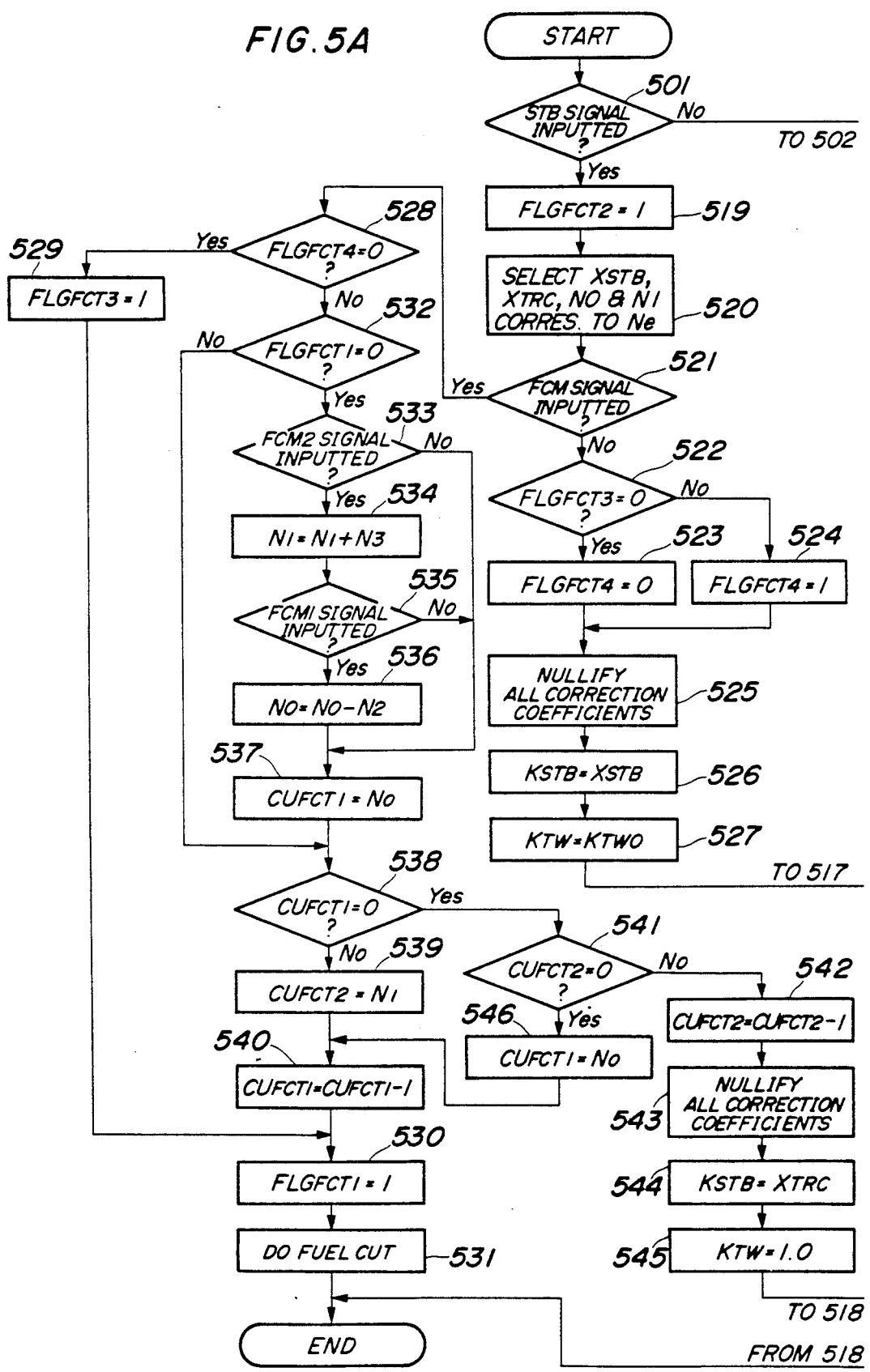

| FIG. 5A | FIG. 5B |

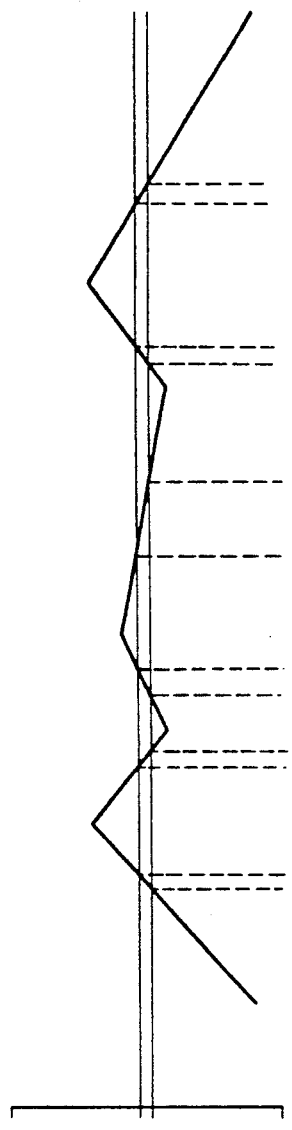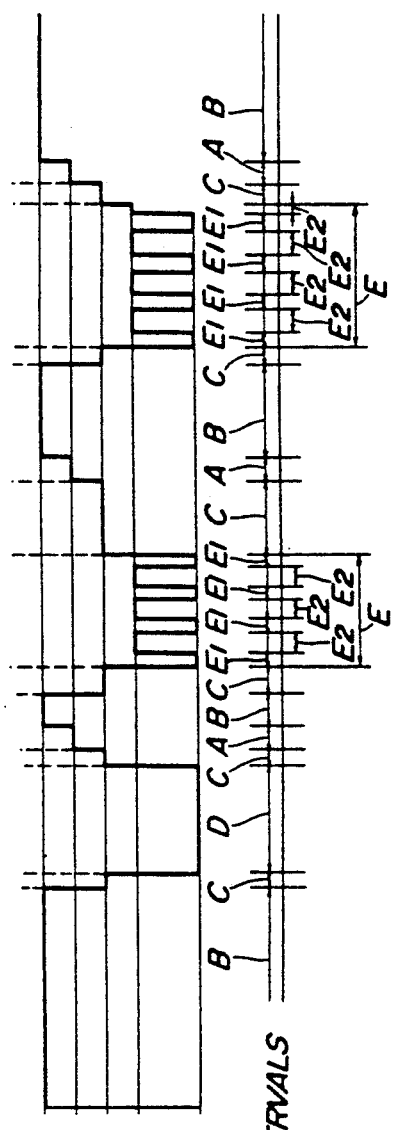

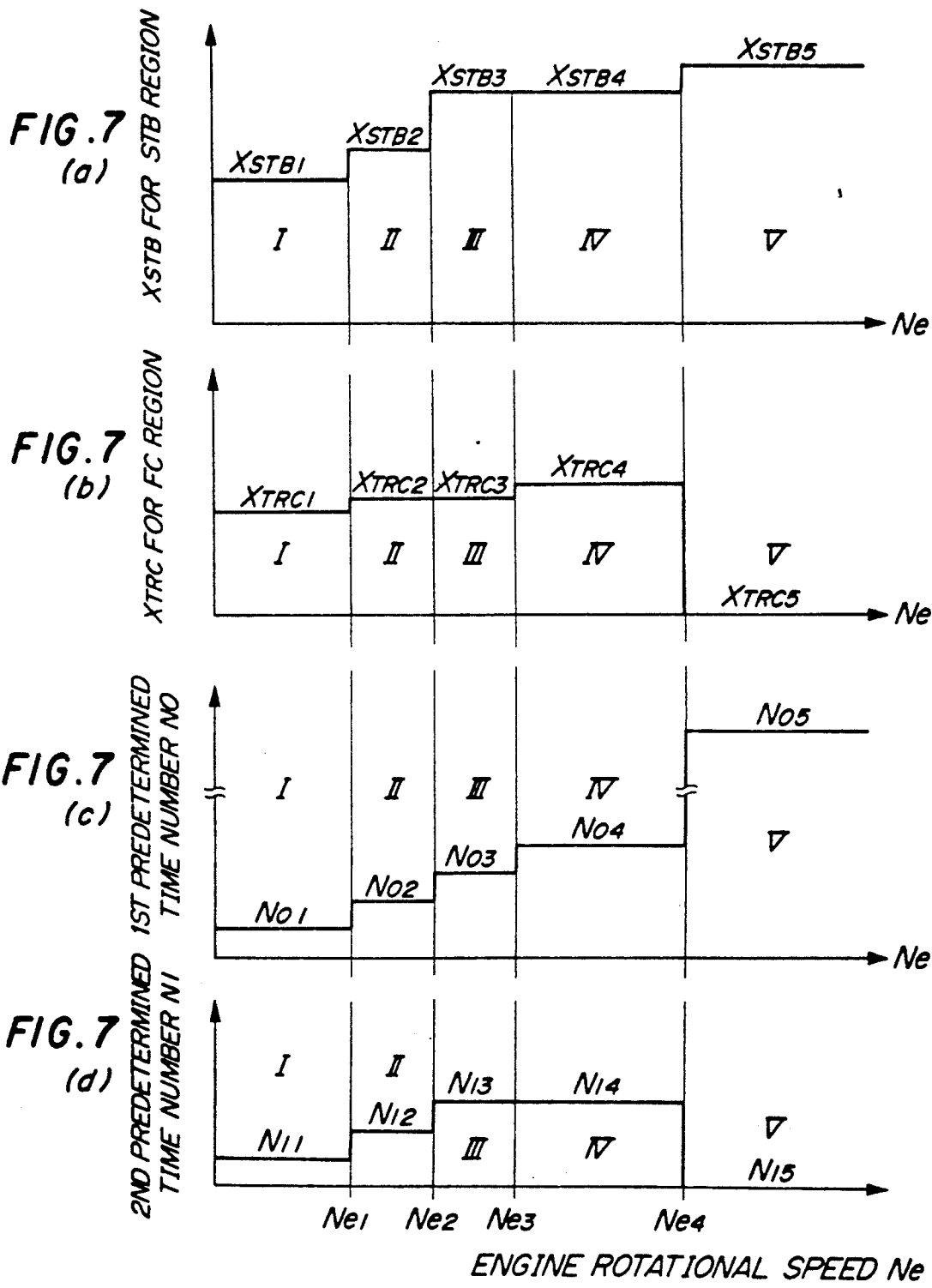

ENGINE COOLANT TEMPERATURE Tw

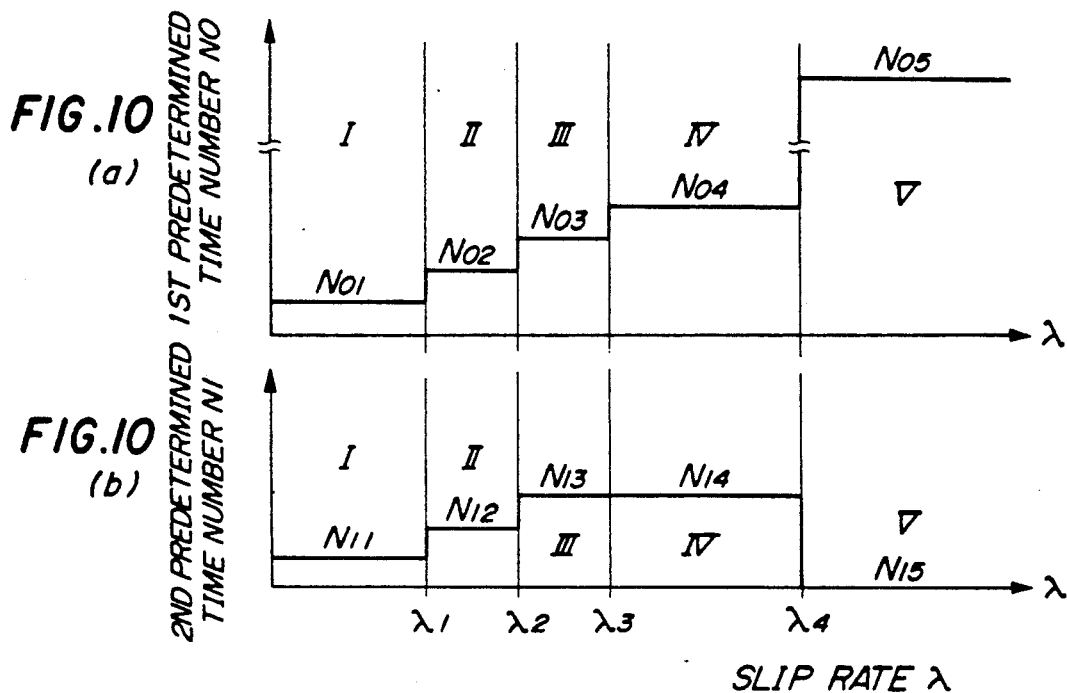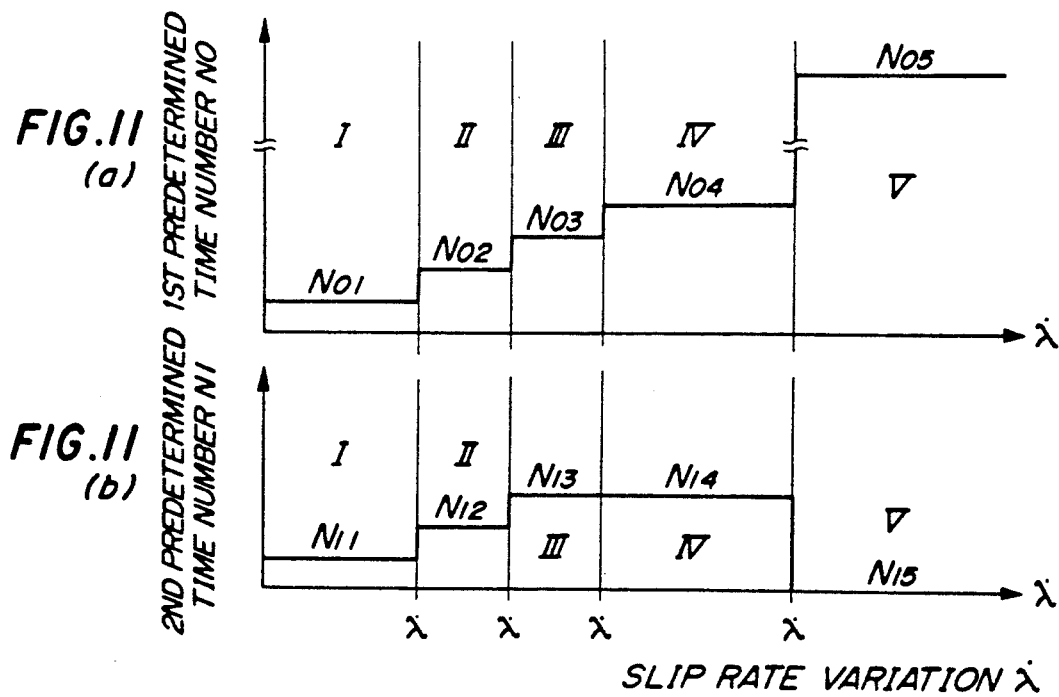

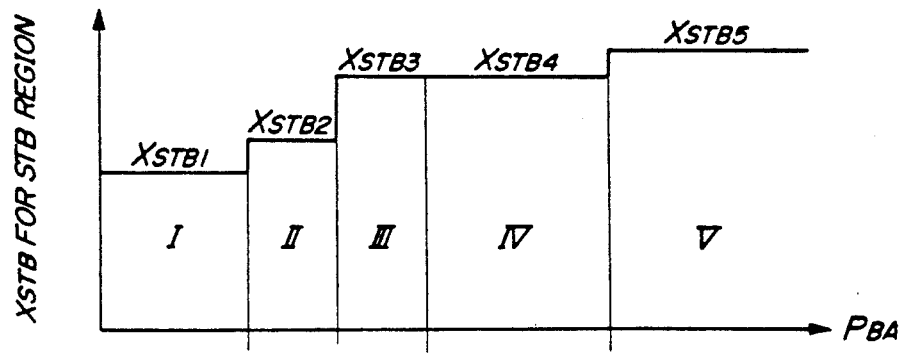
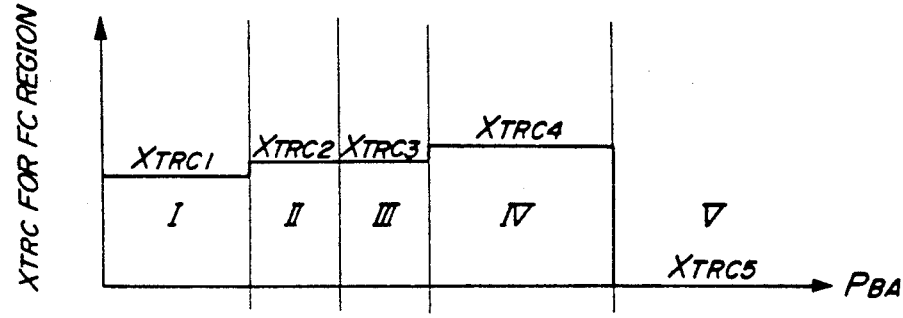
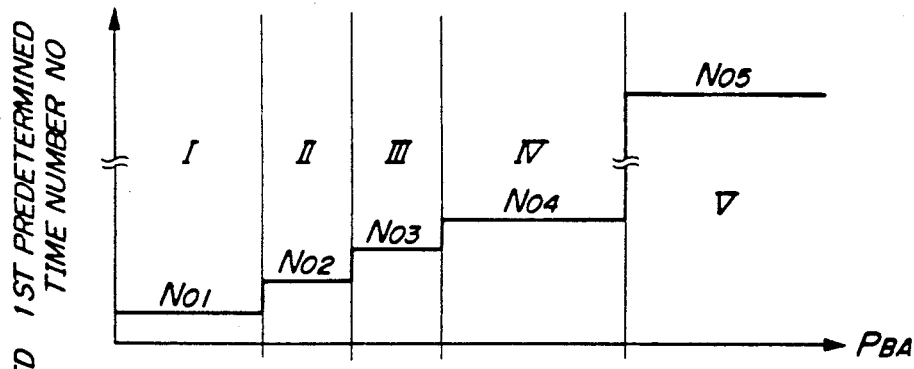
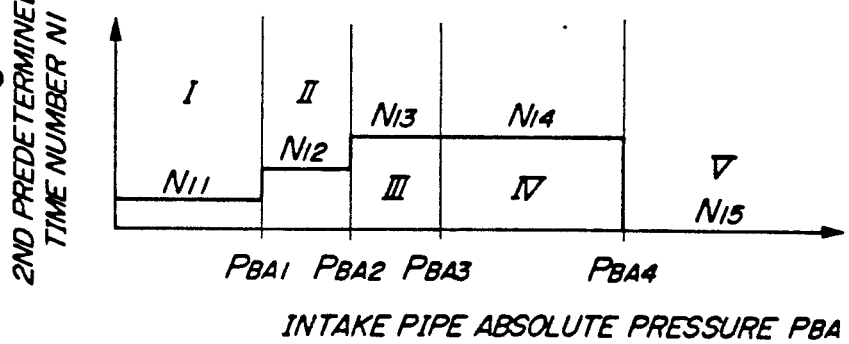
FIG.12

| | 1 | 2 | 3 | 4 | 5 | 6 |
|---|---|---|---|---|---|---|
| LVL6 | F/C | F/C | F/C | F/C | F/C | F/C |
| LVL5 | F/C | F/C | F/C | F/C | F/C | L |
| LVL4 | F/C | L | F/C | F/C | F/C | L |
| LVL3 | F/C | L | F/C | L | F/C | L |
| LVL2 | F/C | L | L | L | F/C | L |
| LVL1 | F/C | L | L | L | L | L |
| LVL0 | L | L | L | L | L | L |
| LVLN | O | O | O | O | O | O |

DRIVING WHEEL SLIP CONTROL SYSTEM FOR VEHICLES

CROSS REFERENCE

This is a continuation-in-part application of U.S. Pat. application Ser. No. 198,815 filed May 25, 1988, now abandoned.

BACKGROUND OF THE INVENTION

This invention relates to a driving wheel slip control system for an automotive vehicle, and more particularly to a system of this kind in which the output of an engine in the vehicle is decreased when an excessive slip of a driving wheel thereof is sensed. Further, the invention relates to improvements in or to such systems, which enable proper slip control when the driving wheels have shifted to an excessive slip state, and when they have left the excessive slip state.

As recognized in general, a driving wheel of an automotive vehicle undergoes a slip when the vehicle starts to move or when it under acceleration, if the driving force of the driving wheel surpasses a frictional force developed between the tire of the driving wheel and the road surface [=the coefficient of friction between the tire and the road surface = load of the vehicle weight on the driving wheel (wheel load)]. The frictional force acts in the advancing or longitudinal direction of the vehicle. The magnitude of the slip may be represented by a slip rate $\lambda$ which is expressed by the following equation:

$$\lambda = (V_W - V)/V_W \quad (1)$$

where $V_W$ represents the circumferential velocity of the driving wheel, and V represents the speed of the vehicle.

The frictional force F between the driving wheel tire and the road surface, which defines the upper limit of the effective driving force of the driving wheel, varies with the slip rate $\lambda$, as shown in FIG. 1. It will be noted from the figure that the frictional force F assumes the maximum value when the slip rate $\lambda$, has a predetermined value $\lambda_0$. While the longitudinal frictional force F varies with slip rate $\lambda$ as indicated by the solid line in the graph, the transverse frictional force, which acts in the transverse direction of the vehicle, varies with slip rate $\lambda$, as indicated by the broken line in the graph, such that it becomes smaller as the slip rate increases.

A slip prevention system has been proposed, e.g. by Japanese Patent Publication (Kokoku) No. 52-35837, which is based upon the above recognition of the relationship between longitudinal frictional force, transverse (or lateral) frictional force and slip rate, and which controls the slip rate such that the longitudinal frictional force may be the maximum so as to obtain the maximum driving efficiency of the vehicle, while the transverse frictional force may have a drop as small as possible so as to prevent a skid or sideslip of the vehicle.

The above proposed control system is constructed such that the slip of the driving wheels is prevented from becoming excessive through control of the torque of the engine by turning on and off an ignition device of the engine of the vehicle or by allowing and inhibiting fuel supply from a fuel supply device to the engine. However, according to the proposed control system, immediately when either one of the driving wheels has shifted from a moderate slip state to an excessive slip state, fuel supply is suddenly interrupted, for instance, which results in a sudden drop in the torque or driving force of the engine, and on the other hand, when the driving wheel leaves the excessive slip state, fuel supply is suddenly resumed, resulting in a sudden increase in the torque or driving force of the engine. Thus, according to the proposed control system, the driver or passenger will feel a shock, i.e. degraded driveability both at the time of transition to the excessive slip state and at the time of transition from the excessive slip state.

A solution to this problem would be to reduce the fuel supply to the engine instead of completely cutting off the fuel supply as above, so as to progressively reduce the torque of the engine. However, the slip rate variation of the driving wheels varies depending upon running conditions of the vehicle. Therefore, if the vehicle is in a running condition wherein the slip rate variation is large, mere decrease in the torque of the engine according to the solution would lead to insufficient control of the slip so that a desired slip rate will be attained with much delay, resulting in degraded driveability.

While internal combustion engines in general have combustion characteristics varying with engine rotational speed, the above proposed control system does not contemplate slip control in accordance with engine rotational speed. Therefore, it would fail to properly control the combustion characteristics when the driving wheels have shifted to an excessive slip state. A result of this failure would be emission of unburnt fuel in large quantities, leading to so-called after-fire, i.e. combustion of unburnt fuel in the exhaust system of the engine. Further, if an exhaust purging catalyst device, particularly a three-way catalytic converter, is provided in the exhaust system, combustion of unburnt fuel in the exhaust system will cause an excessive rise in the temperature of the catalyst device, deteriorating the performance thereof.

Furthermore, according to the proposed control system no contemplation is made of load on the engine in effecting the fuel supply control for slip control. For instance, in the case of controlling the air-fuel ratio to a leaner value in an excessive slip state, the amount of drop in the torque or driving force of an internal combustion engine to be caused by reducing the fuel amount supplied to the engine varies depending upon the magnitude of load on the engine. Therefore, in effecting slip control independently of load on the engine in the excessive slip state, if the target air-fuel ratio is set at a value conforming to a high load operating condition of the engine, slip control is effected to an excessive extent when the engine is operating in a low load operating condition, whereas if the target air-fuel ratio is set at a value conforming to a low load operating condition of the engine, slip control is effected to an insufficient extent when the engine is operating in a high load operating condition. This, therefore, makes it impossible to achieve desired values of slip rate over the entire load range, thereby failing to secure good driveability of the vehicle.

Another driving wheel slip control system is conventionally known e.g. by Japanese Provisional Patent Publication (Kokai) No. 58-8436, in which the degree of the slip is detected based on the difference $\Delta V$ between the driving wheel speed and the trailing wheel speed of the vehicle, and when an excessive slip state in which the wheel speed difference $\Delta V$ is great is detected, the amount of fuel supplied to the engine is decreased stepwise in the following order of (a) to (f) as the wheel speed difference ΔV is increased, whereby the vibration of a vehicle caused by a sudden drop in the output torque of the engine is prevented.

(a) An air-fuel mixture supplied to a first cylinder is leaned (the amount of the mixture is reduced).

(b) Supply of fuel to the first cylinder is cut off (fuel cut to the first cylinder is executed).

(c) While supply of fuel to the first cylinder is cut off, an air-fuel mixture supplied to a second cylinder is leaned.

(d) Supply of fuel to the first and second cylinders is cut off.

(e) While supply of fuel to the first and second cylinders is cut off, an air-fuel mixture supplied to a third cylinder is leaned.

(f) Supply of fuel to the first, second and third cylinders is cut off.

An excessive slip state of a driving wheel can take place instantly as a sudden excessive slip, particularly on a road surface having a small friction coefficient (e.g. on a wet road surface). Therefore, according to the conventional control system described above, in such event the control is executed in such a manner that the control stage is directly shifted from (a) to (d), or (b) to (f).

In the meanwhile, in a type of internal combustion engine in which fuel is injected into an intake pipe thereof, fuel remains within the intake pipe in the form of fuel adhering to the intake valve and its vicinity. The amount of the residual fuel depends on the amount of fuel injected last time, and therefore it is increased particularly during acceleration of the vehicle at which the excessive slip may occur. Therefore, in the conventional system, if the control stage is directly shifted from (a) to (d), the second cylinder undergoes fuel cut immediately from the ordinary fuel injection state, i.e. the state in which there remains a large amount of fuel within the intake pipe. Accordingly, although most of the residual fuel is then drawn into the cylinder, the mixture supplied into the cylinder does not have so rich an air-fuel ratio as to cause complete burning of the fuel in the cylinder, which results in fuel being discharged into the air as unburned ingredients, whereby the exhaust emissions are degraded. Further, in the case of the control stage directly shifting from (b) to (f), for example, the above-described problem arises in a more severe form.

Further, in an automotive vehicle with an engine equipped with an exhaust gas-purifying device in an exhaust system thereof, such as a catalytic converter, the unburned ingredients will burn within the catalytic converter, thereby reducing its performance and actually damaging it.

Further, according to the conventional control system, at the control stage of (d), fuel cut to the first and second cylinders is executed, whereas an ordinary amount of fuel is supplied to the other cylinder, so that there occurs a great difference in output between the cylinders, which leads to increased pulsation of the engine torque.

SUMMARY OF THE INVENTION

It is therefore an object of the invention to provide a driving wheel slip control system for a vehicle, which is capable of preventing a driving shock and promptly attaining a desired slip rate to thereby improve driveability when the driving wheel(s) of the vehicle has shifted to an excessive slip state, by properly controlling the torque of an engine of the vehicle in accordance with slip rate variation in particular.

It is a further object of the invention to prevent afterfire as well as deterioration of the performance of the catalyst device in the engine exhaust system due to its excessive temperature rise, when the driving wheel(s) is in the excessive slip state.

It is another object of the invention to prevent a driving shock and hence improve driveability when the driving wheel(s) has left the excessive slip state, by restraining a sudden increase in the torque of the engine.

In order to attain the above objects, the present invention provides a system for controlling the slip of driving wheels of a vehicle equipped with an engine, including fuel supply means for supplying fuel to the engine, excessive slip detecting means for detecting an excessive slip state of at least one of the driving wheels of the vehicle wherein the slip of the at least one driving wheel has a magnitude greater than a predetermined magnitude, and engine output reducing means associated with the fuel supply means and the excessive slip detecting means, for reducing output from the engine when the excessive slip state is detected by the excessive slip detecting means. The system according to the invention is characterized by an improvement wherein the engine output reducing means comprises means for causing the fuel supply means to repeat alternate fuel cut and fuel supply in a manner such that fuel supply is stopped for a first predetermined period of time, and fuel supply is effected for a second predetermined period of time following the first predetermined period of time, when the excessive slip state is detected by the excessive slip detecting means.

The engine output reducing means causes the fuel supply means to supply the engine with an amount of fuel smaller than an amount of fuel required for an operating condition of the engine assumed when the at least one driving wheel is in the excessive slip state, for the second predetermined period of time.

Preferably, the amount of fuel supplied to the engine for the second predetermined period of time is set by a fuel decremental value determined in dependence on an operating condition of the engine assumed when the at least one driving wheel is in the excessive slip state. The fuel decremental value may be dependent upon at least one of the rotational speed of the engine and pressure in an intake passage of the engine.

Preferably, the ratio between the first and second predetermined period of times is set to a value dependent upon an operating condition of the engine assumed when the at least one driving when is in the excessive slip state, such as the engine rotational speed and pressure in an intake passage of the engine, or to a value dependent upon a slip state of the at least one driving wheel assumed when the at least one driving wheel is in the excessive slip state, such as slip rate or slip rate variation thereof.

Preferably, the engine output reducing means comprises first means for causing the fuel supply means to repeat alternate fuel cut and fuel supply in a manner such that fuel supply is stopped for a first predetermined period of time, and fuel supply is effected for a second predetermined period of time following the first predetermined period of time, when the excessive slip detecting means detects a first one of the excessive slip state wherein the slip of the at least one driving wheel has a smaller variation in magnitude than a certain value, and a second means for causing the fuel supply means to continuously effect fuel supply to the engine for a third predetermined period of time longer than the first predetermined period of time when the excessive slip detecting means detects a second one of the excessive slip state wherein the slip of the at least one driving wheel has a greater variation in magnitude than the certain value.

Alternatively, the second means may cause the fuel supply means to continuously effect fuel supply to the engine as long as the excessive slip detecting means detects the second one of the excessive slip state.

Also preferably, the system may further comprise second engine output reducing means associated with the excessive slip detecting means, and operable when the excessive slip detecting means detects that the at least one driving wheel has left the excessive slip state, for reducing output from the engine to a value smaller than a value required for an operating condition of the engine assumed immediately after the at least one driving wheel has left the excessive slip state.

The second engine output reducing means may comprise mixture leaning means which leans a mixture supplied to the engine, or ignition timing retarding means which retards ignition timing in the engine.

It is a further object of the instant invention to provide a driving wheel slip control system which is capable of eliminating the shock caused by a sudden drop in the engine output when a driving wheel is in an excessive slip state, reducing the pulsation factor of the engine torque to a further degree, and preventing degradation of exhaust emissions as well as of performance of the catalytic converter due to residual fuel in the intake pipe.

In order to attain the above object, the invention provides a driving wheel slip control system having a driving wheel speed sensor for sensing the speed of a driving wheel of a vehicle, excessive slip sensing means which outputs, in response to an output from the driving wheel speed sensor, a slip value corresponding to the degree of an excessive slip of the driving wheel when the excessive slip of the driving wheel is sensed, and fuel supply control means for controlling the amount of fuel supplied to an engine depending on the slip value, characterized by comprising first leaning means for leaning the air-fuel ratio of an air-fuel mixture supplied to all the cylinders of the engine when the slip value is greater than a first predetermined slip value, fuel cut-off means for cutting off the fuel supply to cylinders the number of which depends on the slip value when the slip value exceeds a second predetermined slip value which is greater than the first predetermined slip value, and second leaning means for leaning the air-fuel mixture supplied to cylinders other than the cylinder the fuel supply to which is cut off by the fuel cut-off means, when the slip value exceeds the second predetermined slip value.

Preferably, the first and second leaning means effect leaning of the air-fuel ratio to a greater degree as the slip value is increased.

More preferably, the degree of leaning of the air-fuel ratio to be effected by the second leaning means when the slip value slightly exceeds the second predetermined slip value is smaller than the degree of leaning of the air-fuel ratio to be effected by the first leaning means when the slip value is equal to the second predetermined slip value.

When the slip value exceeds the first predetermined slip value, the air-fuel ratio of a mixture supplied to all the cylinders is leaned. When the slip value is further increased to exceed the second predetermined slip value, supply of fuel to cylinders the number of which depends on the slip value is cut off, and at the same time the air-fuel ratio of a mixture supplied to the cylinders fuel supply to which is not cut off is leaned.

Further, the degree of leaning of a mixture supplied to cylinders is increased as the slip value is increased.

Further, when the slip value exceeds the second predetermined slip value, the degree of leaning of a mixture is alternately decreased, and then increased as the slip value is increased.

BRIEF DESCRIPTION OF THE DRAWINGS

The advantages of the invention will become apparent in the following description taken in conjunction with the drawings, wherein:

FIG. 4 is a schematic circuit diagram showing an essential part of an electronic control unit (ECU) 35 in FIG. 1;

FIG. 6 is a timing chart showing the relationship between a slip rate or a slip rate variation, output signals from the circuit of FIG. 4, and the slip control;

FIG. 7 is a view showing tables of predetermined values $X_{STB}$, $X_{TRC}$, and predetermined time numbers $N_0$, $N_1$ plotted with respect to engine rotational speed Ne;

FIG. 10 is a view showing tables of first and second predetermined time numbers $N_0$ and $N_1$, plotted with respect to slip rate $\lambda$;

FIG. 11 is a view showing tables of first and second predetermined time numbers $N_0$ and $N_1$, plotted with respect to slip rate variation $\lambda\cdot$;

FIG. 12 is a view showing tables of predetermined values $X_{STB}$ and $X_{TRC}$, and first and second predetermined time numbers $N_0$ and $N_1$;

DETAILED DESCRIPTION

The invention will now be described in detail with reference to the embodiments illustrated in the accompanying drawings.

Figure 1:
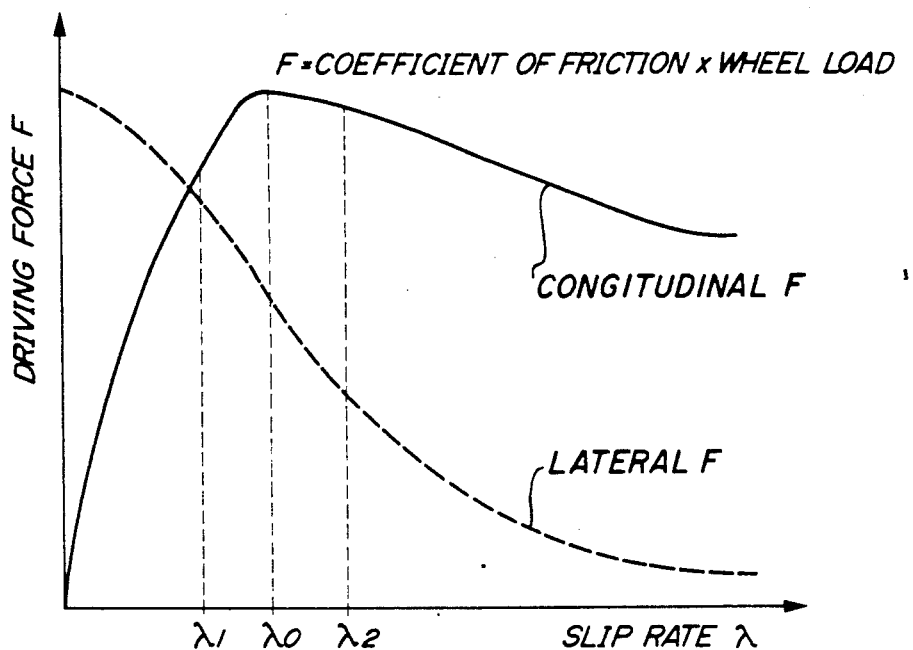
FIG. 1 is a graph showing the relationship between the slip rate of a driving wheel tire of a vehicle and a frictional force between the tire and the road surface.
Figure 2:
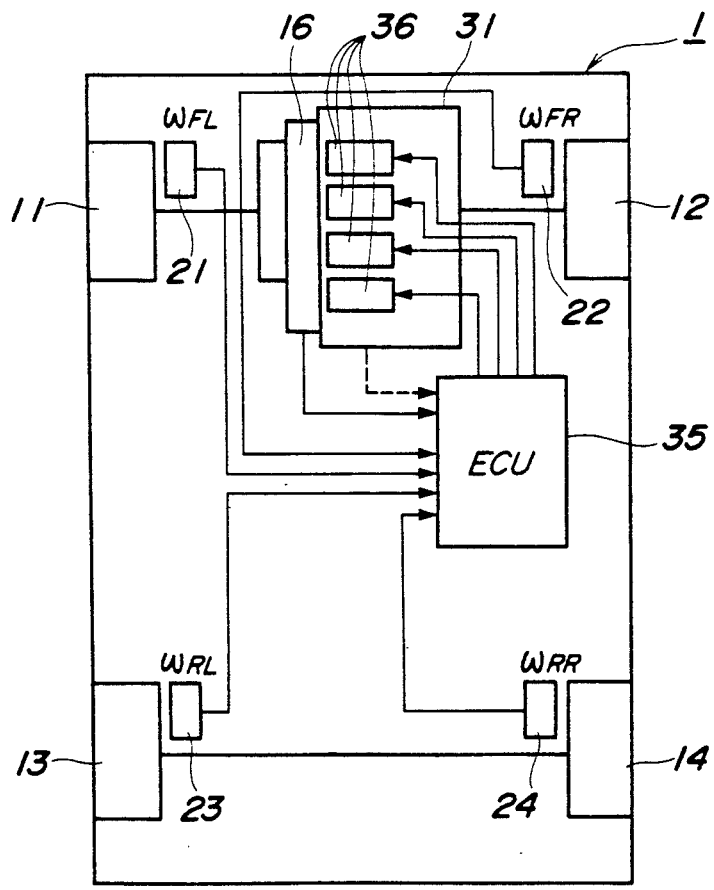
FIG. 2 is a schematic diagram showing the construction of a vehicle equipped with a driving wheel slip control system according to the invention.

In the first embodiment, in FIG. 2, there is shown a vehicle 1 equipped with a driving wheel slip control device according to the invention. The vehicle 1 is a front wheel drive type with front wheels 11 and 12 as driving wheels which are driven by an internal combustion engine 31, and rear wheels 13 and 14 as driven or trailing wheels. Further, the invention could be similarly applied to a rear wheel drive type vehicle. Therefore, for the purposes of this application, trailing wheels are considered to be non-driving wheels. In other words, in a front wheel drive car, the trailing wheels would be the rear wheels, while in a rear wheel drive car, the trailing wheels (non-driving wheels) would be the front wheels. The driving wheels 11, 12 and the trailing wheels 13, 14 are provided, respectively, with driving wheel speed sensors 21, 22, and trailing wheel speed sensors 23, 24, the driving wheel speed sensors 21, 22 sensing the rotational speeds $\omega FL$ and $\omega FR$ of the respective left and right driving wheels, and the trailing wheel speed sensors 23, 24 sensing the rotational speeds $\omega RL$ and $\omega RR$ of the respective left and right driven wheels. Output signals from these sensors are delivered to an electronic control unit (hereinafter referred to as "ECU") 35. In the present embodiment, ECU 35 forms excessive slip detecting means, engine output reducing means, and second engine output reducing means.

In ECU 35, the larger value of the driving wheel speeds $\omega FL$ and $\omega FR$ is selected as the driving wheel speed $V_W$ in equation I above and the speed $\omega RL$ or $\omega RR$ of the trailing wheel on the same side as the driving wheel whose speed is selected as $V_W$ is calculated and used as the vehicular speed V in equation I above. The slip rate $\lambda$ is thus calculated in the following equation:

$$\lambda = \frac{(\omega FL \text{ or } \omega FR) - (\omega RL \text{ or } \omega RR)}{\omega FL \text{ or } \omega FR} \quad (II)$$

Furthermore, the variation or differential value $\dot\lambda$ of the slip rate $\lambda$ is also determined by ECU 35. In digital control, the variation $\dot\lambda$ may be calculated from a difference in the slip rate $\lambda$ between adjacent processing cycles.

In addition, a transmission 16 is interposed between the engine 31 and the driving wheels 11 and 12. The transmission 16 is equipped with a sensor, not shown, which transmits a transmission signal indicative of a gear ratio selected by the transmission 16 to ECU 35. In ECU 35, the torque of driving wheels 11 and 12 is controlled by controlling the output from the engine 31 by means of a fuel supply control system, described hereinbelow, thereby controlling the slip rate $\lambda$ of the driving wheels 11 and 12.

Figure 3:
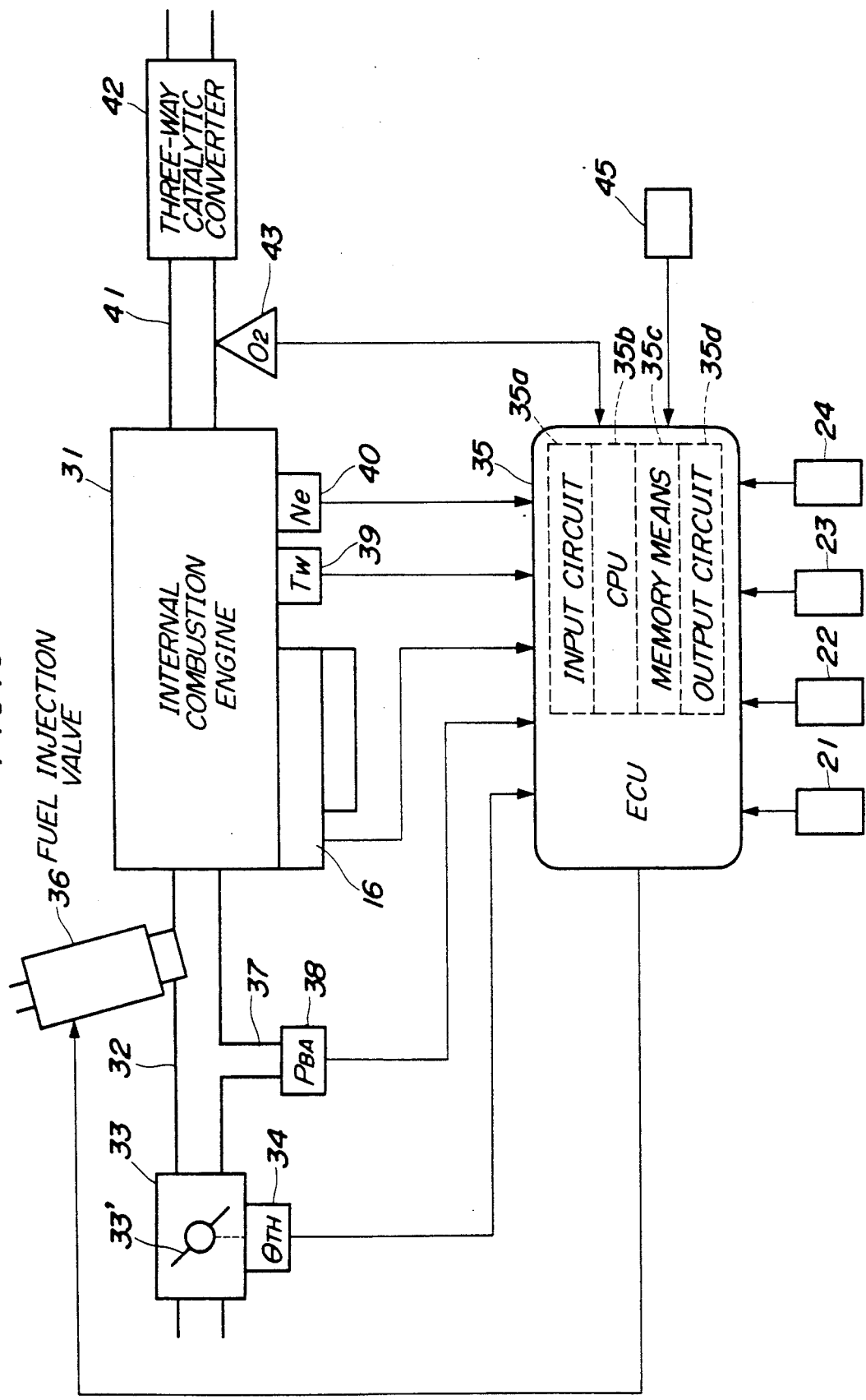
FIG. 3 is a schematic diagram of a first embodiment of the invention showing a fuel supply control system for controlling the torque of the driving wheels.

In FIG. 3, the fuel supply control system is shown, which controls the fuel supply to the engine 31, which may be a six cylinder type, for instance. Of course, the system would be operable on any type of engine. An intake manifold 32 is connected to the engine 31 to provide an intake passage thereto. A throttle valve 33' is disposed inside of a throttle body 33 which is positioned in intake manifold 32. Connected to the throttle valve 33' is a throttle valve opening ($\Theta th$) sensor 34 which converts the opening of the throttle valve 33' into an electrical signal and transmits the signal to ECU 35.

A fuel injection valve (fuel supply means) 36 is positioned between the engine 31 and the throttle body 33. A fuel injection valve 36 is positioned slightly upstream of the intake valve (or valves) of each cylinder. The fuel injection valve 36 is connected to a fuel pump and a fuel source, neither of which is shown, in a conventional manner. Fuel injection valve 36 is electrically connected to ECU 35 as well, and the valve opening time period of the valve is controlled by a signal from ECU 35.

An absolute pressure ($P_{BA}$) sensor 38 is disposed at the end of a pipe 37 which communicates with the intake manifold 32 at a point downstream of throttle valve 33' and upstream of fuel injector 36. An absolute pressure signal, converted into an electrical signal by the absolute pressure sensor 38, is transmitted to ECU 35.

An engine coolant temperature sensor (hereinafter referred to as "TW sensor") 39 is disposed on the cylinder block of the engine 31 to monitor the temperature of the engine coolant or engine cooling water. The TW sensor 39 is formed of a thermistor (or a like device) mounted in the peripheral wall of the engine cylinder which is filled with coolant and applies the detected coolant temperature signal to ECU 35. An engine speed sensor (hereinafter referred to as "Ne sensor") 40 is connected to a crankshaft or a camshaft, neither of which is shown, of the engine. The Ne sensor 40 outputs a crank angle position signal (hereinafter referred to as "TDC" (top dead center) signal) at a predetermined crank angle position for every 120° rotation of the crankshaft of the engine in this example with a six cylinder type, the predetermined crank angle position being at a predetermined angle before top dead center (TDC) at the beginning of the intake stroke for each cylinder, and this TDC signal is transmitted to ECU 35.

A three-way catalytic converter 42 is disposed in an exhaust pipe 41 and performs the purging of HC, CO and NOx components in the exhaust gases. On the upstream side of the catalytic converter 42, an O$_2$ sensor 43 is disposed in exhaust pipe 41. Sensor 43 detects the concentration of oxygen in the exhaust gases and transmits an O$_2$ concentration signal to ECU 35. Furthermore, the driving wheel speed sensors 21 and 22, and trailing wheel speed sensors 23 and 24 are connected to ECU 35. Other sensors 44 are provided to detect other engine parameters and connected to ECU 35, the sensors 44 including the aforementioned sensor for detecting the selected gear ratio of transmission 16.

ECU 35 includes an input circuit 35a for shaping the waveforms of input signals from various sensors (including driving wheel speed sensors 21 and 22, trailing wheel sensors 23 and 24, the gear ratio sensor of the transmission 16) to shift the voltage levels of sensor output signals to a predetermined level, to convert analog signals from sensors to digital signals and so forth. ECU 35 also includes a central processing unit (hereinafter referred to as "CPU") 35b, memory means 35c storing various operational programs which are executed in CPU 35b and operational results therefrom, etc., and an output circuit 35d which outputs a driving signal to fuel injection valve 36, and so forth.

For example, whenever the TDC signal is inputted to ECU 35, the CPU 35b calculates the fuel injection time period TOUT for fuel injection valve 36 from the following equation based on engine parameter signals from the above various sensors which are fed through the input circuit 35a:

$$T_{OUT} = T_i \times (K_{TW} \times K_{PA} \times K_{STB} \times K_{WOT} \times K_{LS} \times K_{AST} \times K_{PB} \times K_{02}) + (T_{ACC} + T_{IDL}) \quad \text{(III)}$$

wherein Ti is a basic value of the fuel injection time period for fuel injection valves 36, and is determined as a function of engine rotational speed 'Ne and absolute pressure P$_{BA}$ in the intake pipe 32. K$_{TW}$ is an engine coolant temperature-dependent fuel increasing coefficient which is determined as a function of engine coolant temperature TW and applied at warming-up of the engine 31 for accelerating the warming-up as well as early securing an appropriate air-fuel ratio after the start of the engine. K$_{PA}$ is an atmospheric pressure-dependent correction coefficient. K$_{STB}$ is a correction coefficient provided by the invention, applied for slip control and is determined in accordance with slip rate λ and differential value or rate λ· of slip rate λ, as hereinafter described. K$_{WOT}$ is a mixture-enriching coefficient applied at wide-open-throttle or full opening of the throttle valve, K$_{LS}$ is a mixture-leaning coefficient applied at full closing of the throttle valve, and K$_{AST}$ is a fuel increasing coefficient applied immediately after the start of the engine. K$_{PB}$ is a predicted load-dependent correction coefficient which is determined in accordance with a rate of change of the intake pipe absolute pressure P$_{BA}$, and K$_{02}$ is an O$_2$-feedback correction coefficient which is determined in response to the output of the O$_2$ sensor.

T$_{ACC}$ and T$_{IDL}$ are correction variables, the former being an acceleration fuel increasing coefficient applied at acceleration of the engine, and the latter being an idle correction coefficient applied at idle of the engine. Then, CPU 35b feeds through output circuit 35d a driving signal to fuel injection valve 36 to open valve 36 for a time period T$_{OUT}$ as set forth above. For example, in order to cut fuel to a cylinder, the driving signal from CPU 35b would simply be inhibited.

FIG. 4 shows the configuration of the principal part of CPU 35b of FIG. 3. In FIG. 3, an average vehicular speed arithmetic circuit 49 receives driving wheel speed signal inputs from driving wheel speed sensors 21 and 22 which represent ωRL and ωRR, respectively. The circuit 49 calculates from the signal inputs the average value (ωRL+ωRR)/2. An average vehicular speed checking circuit 50 receives the average value (ωRL+ωRR)/2 and compares same with a predetermined value V$_{MIN}$ (e.g. 5 km/h) to determine whether the vehicular speed is in a very low region. The circuit 50 outputs a high level signal (hereinafter referred to as "H signal") when the former is lower than the latter, and a low level signal (hereinafter referred to as "L signal") when the former is higher than the latter, and applies the output signals to a driving wheel speed selecting circuit 51. The circuit 51 selects the smaller value of the two detected driving wheel speeds ωFL and ωFR when the H signal is supplied from the average vehicular speed checking circuit 50, i.e. when the vehicular speed is in the very low region (Lo-Select Mode), and the larger value of the two detected driving wheel speeds ωFL and ωFR when the L signal is supplied from the circuit 50, i.e. when the vehicular speed is not in the very low region (Hi-Select Mode). The selected detected driving wheel speed ωRL or ωRR is inputted to a slip rate calculating circuit 53 wherein it is applied to Equation I set forth above as the driving wheel speed V$_W$. A trailing speed selecting circuit 52 selects one of the two detected speeds ωRL and ωRR of the left and right trailing wheels which is on the same side as one of the driving wheels whose detected speed value has been selected by the driving wheel speed selecting circuit 51. The selected detected trailing wheel speed ωRL or ωRR is inputted to the slip rate calculating circuit 53 wherein it is applied to Equation I set forth above as the vehicular speed V.

The slip rate calculating circuit 53 operates on the outputs from the selecting circuits 51 and 52 to calculate a slip rate λ based upon Equation II. An output indicative of the calculated slip rate λ is applied to a differentiating circuit 54 which in turn calculates from the input slip rate λ a differential value λ·.

A predetermined value setting circuit 60 is supplied with the signal indicative of the gear ratio from the gear ratio sensor of transmission 16 to set, based upon the input gear ratio, a correction coefficient k$_1$ and a correction variable C$_1$ which are applied to determine a first threshold value λ$_1$ of slip rate λ, a correction coefficient k$_2$ and a correction variable C$_2$ which are applied to determine a second threshold value λ$_2$ of slip rate λ, a correction coefficient r$_1$ and a correction variable F$_1$ which are applied to determine a first reference value λ·$_1$ of slip rate variation λ·, and a correction coefficient r$_2$ and a correction variable F$_2$ which are applied to determine a second reference value λ·$_2$ of slip rate variation λ·. The correction coefficients r$_1$ and r$_2$ and the correction variables F$_1$ and F$_2$ are further corrected in dependence on control lag from the time ECU 35 commands the fuel supply control system to operate to the time the latter actually starts to operate.

A first reference speed calculating circuit 61 is supplied with the output indicative of vehicular speed V from the trailing wheel selecting circuit 52 as well as the output indicative of correction coefficient k$_1$ and correction variable C$_1$ from the predetermined value setting circuit 60 and calculates from the input signals a first reference value V$_{R1}$ based upon the following equation:

$$V_{R1} = k_1 V + C_1 \quad \text{(IV)}$$

From the first reference speed value $V_{R1}$ calculated as above can be determined the first threshold value $\lambda_1$ of slip rate based upon an equation $\lambda_1 = (V_{R1} - V)/V_{R1}$. Further, the first reference speed calculating circuit 61 compares the calculated first reference speed value $V_{R1}$ with a first lower limit $V_{C1}$, and selects the larger value of the two values $V_{R1}$ and $V_{C1}$. The larger value is outputted from the circuit 61 as the first reference speed value corresponding to the first threshold value $\lambda_1$.

A second reference speed calculating circuit 62 operates, similarly to the first reference speed calculating circuit 61, on the output indicative of vehicular speed V from the trailing speed selecting circuit 52 and the output representing correction coefficient $k_2$ and correction variable $C_2$ from the predetermined value setting circuit 60 to calculate a second reference speed value $V_{R2}$ based upon the following equation:

$$V_{R2} = k_2 V + C_2 \quad \text{(V)}$$

Similarly, the circuit 62 outputs the larger value of the second reference speed value $V_{R2}$ and a second lower limit $V_{C2}$ as the second reference speed value corresponding to the second threshold value $\lambda_2$ of slip rate.

A first correction circuit 65 is supplied with the output indicative of selected trailing wheel speed from the trailing wheel speed selecting circuit 52 and the output indicative of correction coefficient $r_1$ and correction variable $F_1$ corresponding to the selected gear ratio from the predetermined value setting circuit 60. The circuit 65 calculates a first reference value $\lambda \cdot_1$ of slip rate variation based upon the following equation:

$$\lambda \cdot_1 = r_1 V + F_1 \quad \text{(VI)}$$

Similarly, a second correction circuit 66 is responsive to the vehicular speed signal from the trailing wheel speed selecting circuit 52 and the output indicative of correction coefficient $r_2$ and correction variable $F_2$ corresponding to selected gear ratio from the predetermined value setting circuit 60, and calculates a second reference value $\lambda \cdot_2$ of slip rate variation based upon the following equation:

$$\lambda \cdot_2 = r_2 V + F_2 \quad \text{(VIII)}$$

The correction coefficients $k_1$, $k_2$, $r_1$ and $r_2$ and correction variables $C_1$, $C_2$, $F_1$, and $F_2$ are so set that the first and second threshold values $\lambda_1$ and $\lambda_2$ and first and second slip rate variation reference values $\lambda \cdot_1$ and $\lambda \cdot_2$ which are determined from the coefficients and variables as above, satisfy the relationship $\lambda_1 < \lambda_2$ and $\lambda \cdot_1 < \lambda \cdot_2$ irrespective of the value of the selected gear ratio of transmission 16.

An excessive $\lambda \cdot$ decision circuit 55 is supplied with the output indicative of differential slip rate $\lambda \cdot$ from the differentiating circuit 54 and the output indicative of second reference slip rate variation value $\lambda \cdot_2$ from the second correction circuit 66 and compares between them. When the differential value $\lambda \cdot$ is greater than the second reference value $\lambda \cdot_2$, it applies H signal to an OR gate 56, and otherwise it applies L signal to OR gate 56.

A first prediction control decision circuit 58 is supplied with the $\lambda \cdot$ output from the differentiating circuit 54 and the $\lambda \cdot_1$ output from the first correction circuit 66 and compares between them to apply H signal to an AND gate 59 when the differential value $\lambda \cdot$, is greater than the first reference value $\lambda \cdot_1$, and otherwise it generates L signal. A second prediction control decision circuit 63 is supplied with the output indicative of selected driving wheel speed $V_W$ from the driving wheel speed selecting circuit 51 and the output indicative of first reference speed value $V_{R1}$ corresponding to first threshold value $\lambda_1$, from the first reference speed calculating circuit 61 to compare therebetween so that when the driving wheel speed $V_W$ is higher than the first reference speed value $V_{R1}$ it applies H signal to AND gate 59, and otherwise it applies L signal thereto. When supplied with two H signals from the first and second prediction control decision circuits 58 and 63, the AND gate 59 generates H signal which is outputted through OR gate 56.

An excessive $\lambda$, decision circuit 64 is supplied with the $V_W$ output from the driving wheel speed selecting circuit 51 and the output indicative of second reference speed value $V_{R2}$ corresponding to second threshold value $\lambda_2$ from the first reference speed calculating circuit 62 to compare therebetween so that when the driving wheel speed $V_W$ is higher than the second reference speed value $V_{R2}$ it applies H signal to OR gate 56, and otherwise it applies L signal thereto.

As described above, H signal is outputted through the OR gate 56 if any of the following conditions holds: (i) $\lambda \cdot > \lambda \cdot_2$, (ii) $\lambda > \lambda \cdot_1$ and $\lambda > \lambda_1$, and (iii) $\lambda > \lambda_2$. The H signal through OR gate 56 acts as a trigger signal for causing execution of a control program shown in FIG. 5, hereinafter described in detail, to effect control of the fuel supply control system for prevention of excessive differential slip rate (excessive slip rate variation) if the condition (i) holds, prediction control if the condition (ii) holds, and prevention of excessive slip rate if the condition (iii) holds, respectively. According to the invention, the fuel supply is cut (hereinafter referred to as "fuel cut") in response to the H signal through OR gate 56 in a manner hereinafter described in detail so as to reduce the torque of the driving wheels 11 and 12 and hence reduce the slip rate $\lambda$ or the slip rate variation $\lambda \cdot$ to thereby bring the slip rate $\lambda$ to a desired value. The H signal through OR gate 56 will be hereinafter referred to as fuel cut signal (FCM signal) as appearing at (b) (1) of FIG. 6, and a driving region of the vehicle 1 in which the fuel cut signal is generated will be hereinafter referred to as fuel cut region, as shown at (c) (1) of FIG. 6.

The outputs from the first and second prediction control decision circuits 58 and 63 in FIG. 4 are also applied to an OR gate 67 which generates H signal when at least either one of the outputs from the circuits 58 and 63 is H signal, that is, if either the condition $\lambda \cdot > \lambda \cdot_1$ or the condition $\lambda > \lambda_1$ holds. The H signal from the OR gate 67 will be hereinafter referred to as standby signal (STB signal) as shown at (b) (2) of FIG. 6, a driving region of the vehicle 1 in which the standby signal is generated and the fuel cut signal is not generated will be referred to as standby region as at (c) (2) of FIG. 6, and any fuel-supplied driving region of the vehicles other than the standby region and the fuel cut region will be referred to as off-standby region as at (c) (3) of FIG. 6.

The standby region corresponds to a driving region which the vehicle passes immediately before shifting to the fuel cut region from the off-standby region or immediately after leaving the fuel cut region [(a), (c) of FIG. 6], as will be understood from the condition $\lambda \cdot > \lambda \cdot_1$ or $\lambda > \lambda_1$ corresponding to the standby region, and the condition $\lambda \cdot > \lambda \cdot_1$ and $\lambda > \lambda_1$ corresponding to the fuel cut region, etc. According to the invention, this standby region is provided wherein the fuel quantity supplied to the engine 31 is controlled in an appropriate manner as hereinafter described in detail so as to control the air-fuel ratio of a mixture supplied to the engine to an appropriate value and hence control the output or driving force of the engine during transition from the ordinary fuel-supplied region to the fuel cut region or vice versa, because otherwise during transition between the fuel cut region and the ordinary fuel-supplied region there can take place an excessive rise in the temperature of the three-way catalytic converter 42 and after-fire as well as driving shock or degraded driveability.

Referring again to FIG. 4, there are further provided first and second vehicular speed determining circuits 68 and 69. The first vehicular speed determining circuit 68 is supplied with the vehicular speed output V from the vehicular speed selecting circuit 52 and a reference signal representing a first predetermined vehicular speed value $V_1$ (e.g. 12 km/h). It compares between the two values and generates a first determined vehicular speed signal ($FCM_1$ signal) when $V < V_1$ holds. The second vehicular speed determining circuit 69 operates similarly to the circuit 68 to generate a second determined vehicular speed signal ($FCM_2$ signal) when the vehicular speed V is higher than a second predetermined vehicular speed $V_2$ (e.g. 20 km/h) higher than the first predetermined value $V_1$, both inputted thereto.

Figures 5, 5B:
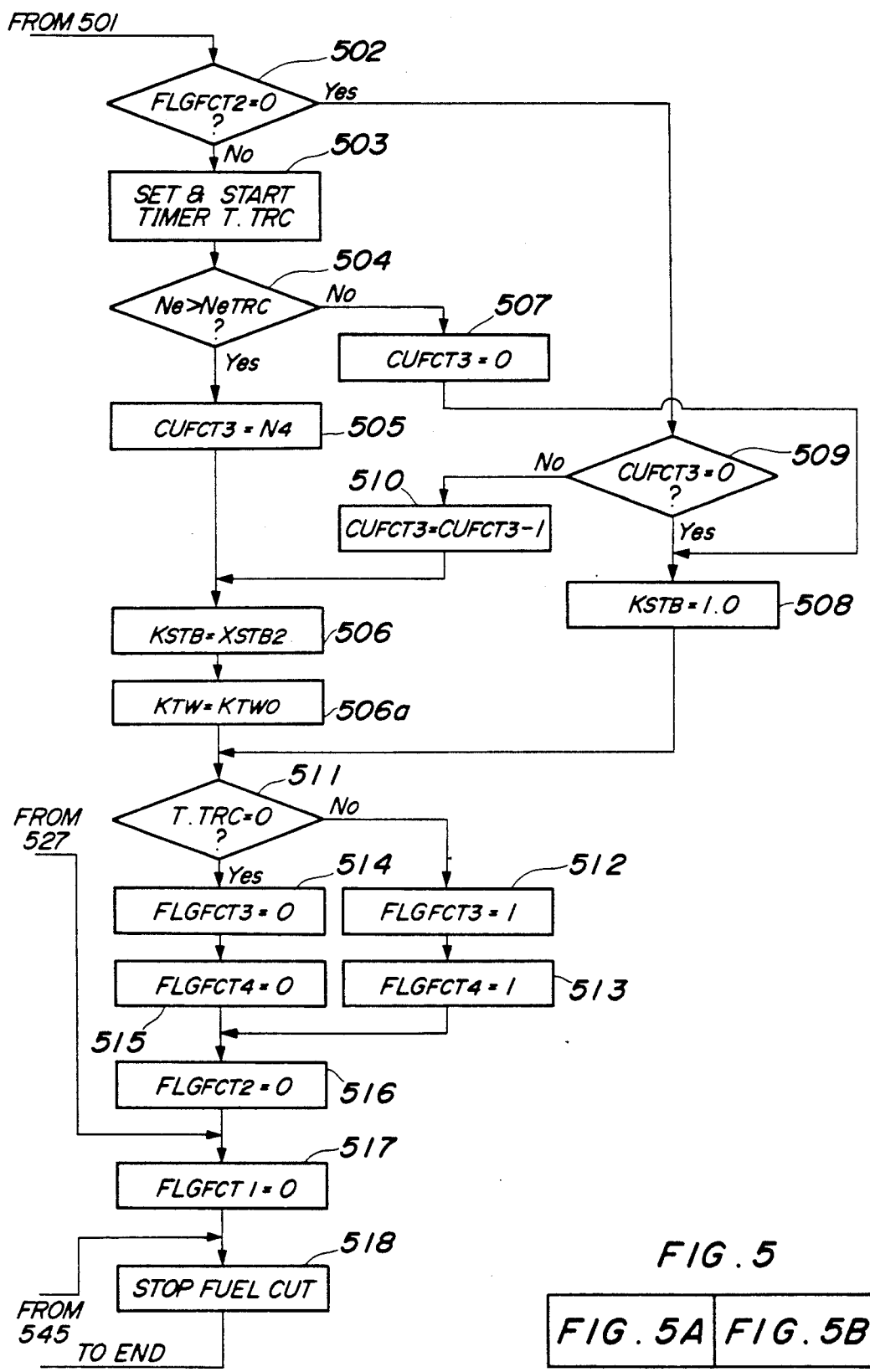
FIG. 5 is a flowchart showing a control program for executing the slip control.

FIG. 5 shows a control program for effecting slip control in dependence on the fuel cut signal and the standby signal outputted from the circuit of FIG. 4 and other engine operating parameters. The present program is executed whenever the TDC signal is inputted to the ECU 35.

First, a step 501 calls for a determination as to whether the standby signal has been inputted. If the answer is No, i.e. if no standby signal has been inputted, which means the vehicle 1 is being driven in the off-standby region, the program proceeds to a step 502 wherein it is determined whether a second flag $FLG_{FCT2}$ is equal to 0. This second flag $FLG_{FCT2}$ is set to 1 at a step 519, referred to later, when the standby signal has been inputted, that is, when the vehicle 1 is being driven in either the standby region or the fuel cut region, whereas it is set to 0 at a step 516, referred to later, when the vehicle 1 is being driven in the off-standby region.

If the answer to the question of step 502 is No, that is, if the second flag $FLG_{FCT2}$ is equal to 1, which means the present loop is the first loop immediately after transition to the standby region, the program proceeds to a step 503. In step 503, a timer T.TRC formed e.g. by a down counter is started to count a predetermined time period tTRC (e.g. 2 sec), followed by a step 504 wherein it is determined whether the engine rotational speed Ne is higher than a predetermined value $Ne_{TRC}$ (e.g. 2300 rpm). If $Ne > Ne_{TRC}$ stands, the program proceeds to a step 505 wherein a third control variable $CU_{FCT3}$ is set to a fifth predetermined number $N_4$ (e.g. 2), followed by a step 506 wherein the correction coefficient $K_{STB}$ for slip control is set to a predetermined mixture-leaning value $X_{STB2}$ (e.g. 0.8) which is applied in the off-standby region, as shown at A of (d) (3) of FIG. 6. Then, the engine coolant temperature-dependent fuel increasing coefficient $K_{TW}$ is set to a predetermined value $K_{TWO}$ at a step 506a, followed by the program proceeding to a step 511, hereinafter described.

Figure 8:
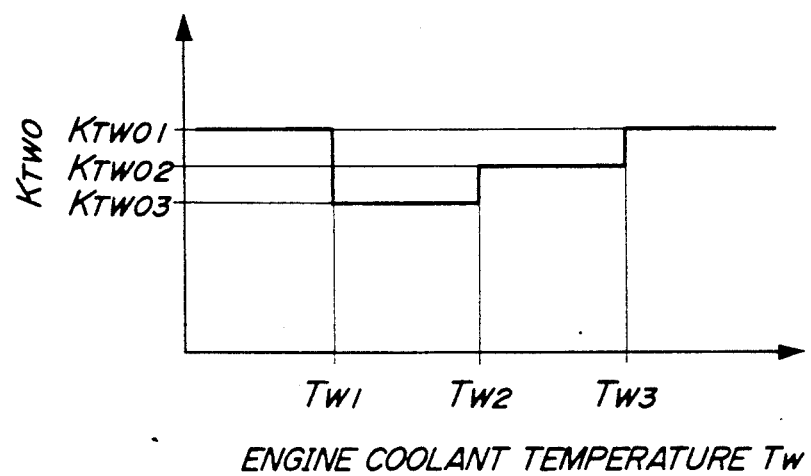
FIG. 8 is a view showing a table of a predetermined value $K_{TWO}$ of an engine coolant temperature-dependent fuel increasing coefficient $K_{TW}$.

The predetermined value $K_{TWO}$ is determined, for example, from a $K_{TWO}$ table, given, by way of example, in FIG. 8, in accordance with the engine coolant temperature TW. According to the FIG. 8 table, the predetermined value $K_{TWO}$ is set in relation to three predetermined engine coolant temperature values TW TW$_3$ (e.g. $-10°$ C., $+20°$ C., and $+50°$ C., respectively). Specifically, it is set to a first value $K_{TWO1}$ (e.g. 1.00) when the engine coolant temperature TW is below TW$_1$ or above TW$_3$ and to a second value $K_{TWO2}$ (e.g. 0.90) when TW is TW$_1$ or more and below TW$_2$ and to a third value $K_{TWO3}$ (e.g. 0.95) when TW is TW$_2$ or more and below TW$_3$, respectively.

If the answer to the question of step 504 is No, that is, if $Ne \leq Ne_{TRC}$ holds, the program proceeds to a step 507 wherein the third control variable $CU_{FCT3}$ is set to 0, followed by setting the slip control correction coefficient $K_{STB}$ to 1.0 at a step 508 (B of (d)(3) of FIG. 6), and then the program proceeds to step 511, referred to above.

If the answer to the question of step 502 is Yes, that is, if the second flag $FLG_{FCT2}$ is 0, indicating that the vehicle was also in the off-standby region in the last loop, the program proceeds to a step 509 wherein it is determined whether the third control variable $CU_{FCT3}$ is 0. If $CU_{FCT3}$ is not 0, $CU_{FCT3}$ is reduced by 1 at a step 510, and then the aforementioned step 506 is executed, followed by step 511 being executed. If $CU_{FCT3}$ is 0, the aforementioned step 508 is executed, followed by execution of step 511.

As will be understood from the above explanation when the engine rotational speed Ne is high (Ne > $Ne_{TRC}$) immediately after the vehicle has shifted to the off-standby region, the slip control correction coefficient $K_{STB}$ is set to the predetermined value $X_{STB2}$ which is smaller than a normal value of 1.0 over a time period corresponding to a number of TDC signals equal to the fifth predetermined number $N_4$ after transition to the off-standby region, as shown at (d) (1) of FIG. 6. By thus setting correction coefficient $K_{STB}$ a lean mixture is supplied to the engine 31 at an instant immediately after fuel cut is terminated so that the output of engine 31 may be made smaller than a normal value, thereby preventing driving shock which would otherwise be caused by sudden recovery of engine torque at the termination of fuel cut. However, if the engine rotational speed Ne is low (Ne $Ne_{TRC}$ immediately after fuel cut termination, the above mixture leaning is inhibited in order to prevent engine stall.

Alternatively of leaning the mixture by making smaller the correction coefficient $K_{STB}$ as above, the ignition timing of the engine 31 may be retarded with substantially the same results as mentioned above, because as the ignition timing is retarded, the output of the engine is smaller.

Figure 9:
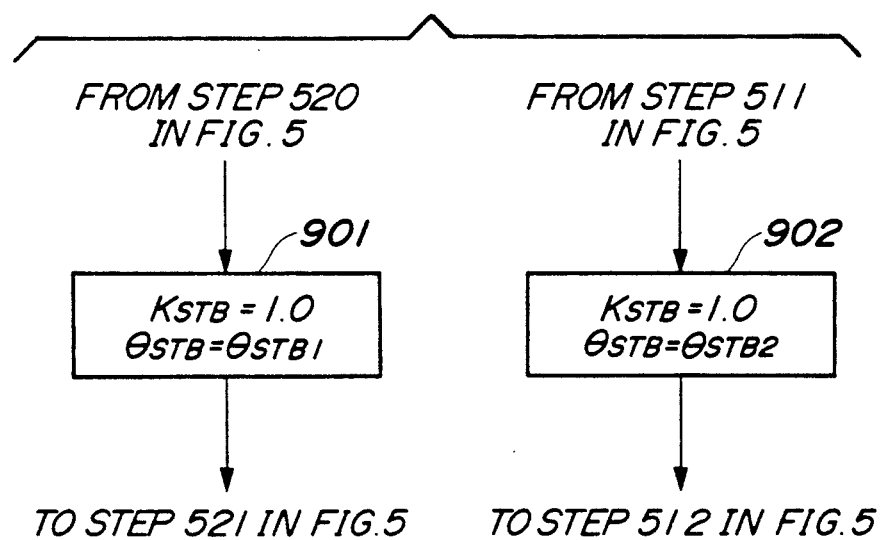
FIG. 9 is a view showing a variation of part of the control program of FIG. 5.

FIG. 9 shows an example of a manner of retarding the ignition timing. In FIG. 9, steps 901 and 902 can be applied in the flowchart of FIG. 5. All the steps in FIG. 5 but the steps 901 and 902 are applicable to the manner of retarding the ignition timing. In the step 901, the correction coefficient $K_{STB}$ is set to 1.0 and a retarding correction value $\Theta_{STB}$ is set to a predetermined value $\Theta_{STB1}$. The set retarding correction value $\Theta_{STB}$ is applied to the following equation to calculate an ignition advance angle $\Theta_{ig}$:

$$\Theta_{ig} = \Theta_{igMAP} + \Theta_{STB} + \Theta_{CR} \quad \text{(VIII)}$$

where the ignition advance angle is a crank angle before a reference crank angle position of a cylinder in which ignition is to be effected (e.g. TDC at the end of a compression stroke), $\Theta_{igMAP}$ is a basic ignition timing value, which is determined from a map stored in the memory means 35c in ECU 35 as a function of engine rotational speed Ne and a parameter representing load on the engine, e.g. absolute pressure in the intake pipe 32. $\Theta_{CR}$ is another retarding correction value which is determined as a function of intake air temperature, etc.

The predetermined value $\Theta_{STB1}$ has a minus value (e.g. 20°), and therefore the ignition timing value $\Theta_{ig}$ is corrected by $\Theta_{STB1}$ to a retard side.

Details of the ignition timing control are disclosed, e.g. by U.S. Pat. No. 4,702,211 assigned to the assignee of the present application.

On the other hand, in the step 902 of FIG. 9, the correction coefficient $K_{STB}$ is set to 1.0, and the retarding correction value $\Theta_{STB}$ is set to another predetermined value $\Theta_{STB2}$ (=0) to inhibit retardation of the ignition timing.

Referring again to FIG. 5, in the step 511, a determination is made as to whether the counted value T.TRC of the timer T.TRC set to start at step 503 is equal to 0. If the counted value T.TRC is not equal to 0, that is, the predetermined time period tTRC has not elapsed after the vehicle 1 shifted to the off-standby region, a third flag $FLG_{FCT3}$ and a fourth flag $FLG_{FCT4}$ are set to 1 at respective steps 512 and 513, and then the program proceeds to a step 516, hereinafter referred to. If the answer to the question of step 511 is Yes, that is, if the counted value T.TRC is equal to 0, indicating that the predetermined time period tTRC has elapsed after shifting to the off-standby region, the third and fourth flags $FLG_{FCT3}$ and $FLG_{FCT4}$ are set to 0 at respective steps 514 and 515, and then the program proceeds to the step 516.

In step 516, the second flag $FLG_{FCT2}$ is set to 0, and then the first flag $FLG_{FCT1}$ is set to 0 at a step 517, followed by the program proceeding to a step 518 wherein the value of the correction coefficient $K_{STB}$ set at step 506 or at 508 is applied to Equation III given before to calculate the fuel injection time period $T_{OUT}$ to effect fuel injection based upon the calculated injection time period $T_{OUT}$ followed by termination of the program.

If the answer to the question of step 501 is Yes, that is, if the standby signal has been inputted, indicating that the vehicle is in either the standby region or the fuel cut region, the program proceeds to a step 519 wherein the second flag $FLG_{FCT}$ is set to 1.

Then, at a step 520, predetermined values $X_{STB}$ and $X_{TRC}$ of correction coefficient $K_{STB}$ to be applied in the standby region and the fuel cut region, respectively, and first and second predetermined numbers $N_0$ and $N_1$ have their values selected, respectively, from an $X_{STB}$ table, an $X_{TRC}$ table, an $N_0$ table, and an $N_1$ table, all stored in the memory means 35c of ECU 35, in accordance with engine rotational speed Ne.

(a)-(d) of FIG. 7 show examples of these tables. According to FIG. 7, each table is divided into five engine speed regions, for each of which is provided a predetermined value of each of $X_{STB}$, $X_{TRC}$, $N_0$, and $N_1$. More specifically, four predetermined values $Ne_1$, $Ne_2$, $Ne_3$, and $Ne_4$ of engine rotational speed Ne (e.g. 2,300 rpm, 2,800 rpm, 3,300 rpm, and 4,800 rpm, respectively) are provided and define the respective engine speed regions, i.e. a region I corresponding to less than $Ne_1$, a region II to $Ne_1$-$Ne_2$, a region III to $Ne_2$-$Ne_3$ a region IV to $Ne_3$-$Ne_4$, and a region V to $Ne_4$ and more, respectively. As predetermined value $X_{STB}$ to be applied in standby region, there are provided values $X_{STB1}$, $X_{STB2}$, $X_{STB3}$, $X_{STB4}$, and $X_{STB5}$ (e.g. 0.50, 0.60, 0.80, 0.80, and 1.70, respectively), to be applied in respective regions I-V. Similarly, as predetermined values $X_{TRC}$ to be applied in fuel cut region, and first and second predetermined numbers $N_0$ and $N_1$ there are provided $X_{TRC1}$-$X_{TRC5}$ (e.g. 0.35, 0.40, 0.40, 0.45, and 0, respectively) as $X_{TRC}$, $N_{01}$-$N_{05}$ (e.g. 1, 2, 3, 4, and 255, respectively) as $N_0$ and $N_{11}$-$N_{15}$ (e.g.1, 2, 3, 3, and 0, respectively) as $N_1$.

These tables may be designed in various forms, depending upon the characteristics of the engine, the kind of the three-way catalytic converter 42, etc.

Then, the program proceeds to a step 521 wherein it is determined whether the fuel cu (FCM) signal has been inputted. If the answer is No, that is, if the fuel cut signal has not been inputted, indicating that the vehicle 1 is being driven in the standby region, it is then determined at a step 522 whether the third flag $FLG_{FCT3}$ is equal to 0. If the flag $FLG_{FCT3}$ is equal to 0, the fourth flag $FLG_{FCT4}$ is set to 0 at a step 523, while if the third flag $FLG_{FCT3}$ is 1, the fourth flag $FLG_{FCT4}$ is set to 1 at a step 524, followed by the program proceeding to a step 525. In the step 525, all the correction coefficients but atmospheric pressure-dependent correction coefficient $K_{PA}$, as well as all the correction variables, which are applied to Equation III given above, are set to 1.0 and 0, respectively. That is, all these correction coefficients and correction variables are rendered virtually ineffective. As a result, it is avoided that any changes in the values of these correction coefficients and correction variables affect the fuel injection time period $T_{OUT}$ which makes it possible to control the air-fuel ratio of the mixture supplied to the engine 31 to an optimal value during standby region, in cooperation with setting of correction coefficients $K_{STB}$ and $K_{TW}$ to $K_{STB}$ and $K_{TWO}$, respectively, at steps 526 and 527, hereinafter described. By thus controlling the air-fuel ratio to an optimal value, emission of unburnt fuel can be reduced in the standby region, thereby preventing after-fire and degradation of the performance of the three-way catalytic converter 42 caused by temperature rise thereof. As stated above, the atmospheric pressure-dependent correction coefficient $K_{PA}$ is not set to 1.0 at step 525, because also in the standby region, the air-fuel ratio can vary depending upon a change in the atmospheric pressure and therefore has to be corrected by means of the correction coefficient $K_{PA}$ even in the standby region.

After setting all the correction coefficients and correction variables to virtually ineffective values at step 525, the program proceeds to step 426 wherein the slip control correction coefficient $K_{STB}$ is set to a value of predetermined value $X_{STB}$ which has been set in step 520 for standby region (at C of (d) (3) of FIG. 6). The ground for this setting of $K_{STB}$ is as follows: During transition between the off-standby region which is an ordinary fuel-supplied region and the fuel cut region wherein fuel supply is interrupted, the air-fuel ratio can largely vary, which can cause unstable combustion of the engine 31 and hence emission of unburnt fuel in large quantities in a low engine speed region in particular, resulting in excessive temperature rise of the three-way catalytic converter 42 and/or in after-fire. Further, the fuel quantity required by the engine 31 varies depending upon engine rotational speed Ne. Still further, in a low engine speed region, the suspension system of the vehicle can be subject to resonance, degrading the driveability. In order to prevent these unfavorable phenomena in the standby region, according to the invention, the slip control correction coefficient $K_{STB}$ is set to predetermined value $K_{STB}$ dependent upon engine rotational speed Ne, whereby excessive temperature rise of three-way catalytic converter and after-fire are prevented and the driveability is improved, over the entire engine speed range.

It will be noted that in a high engine speed region (region V in FIG. 7) the predetermined value X(regionSTB is set to a value (1.7) more than 1.0 in the standby region to enrich the mixture. This is because the mixture enrichment increases the amount of unburnt fuel whose evaporation heat promotes cooling of the three-way catalytic converter 42, thus preventing excessive temperature rise thereof. Conversely, the predetermined value X(regionSTB may alternatively be set to a value less than 1.0 in a high engine speed region in the standby region, so as to lean the mixture, depending upon the kind of three-way catalytic converter and/or characteristics of the engine.

The program then proceeds from step 526 to a step 527, wherein the engine coolant temperature-dependent fuel increasing coefficient $K_{TW}$ which has been set to 1.0 at step 525 is set to the aforementioned predetermined value $K_{TWO}$. By thus setting $K_{TW}$, the mixture supplied to the engine 31 will be leaned in the standby region, which cooperates with the setting of all the correction coefficient and correction variables to virtually ineffective values at step 525 to prevent after-fire as well as degraded performance of the three-way catalytic converter caused by excessive temperature rise thereof, even at lower temperatures of the engine 31.

Following the step 527, the aforementioned steps 517 and 518 are executed to effect fuel injection by applying the slip control correction coefficient $K_{STB}$ and engine coolant temperature-dependent fuel increasing coefficient $K_{TW}$ set at steps 526 and 527, respectively, followed by ending of the program.

If the answer to the question of step 521, that is, if the fuel cut signal has been inputted, indicating that the vehicle 1 is being driven in the fuel cut region, the program proceeds to a step 528 wherein it is determined whether the fourth flag $FLG_{FCT4}$ is equal to 0. If the fourth flag $FLG_{FCT4}$ is equal to 0, the third flag $FLG_{FCT3}$ is set to 1 at a step 529, and the first flag $FLG_{FCT1}$ is set to 1 at a step 530. Then, fuel cut is effected at a step 531 (at D of (d)(3) of FIG. 6), followed by ending of the program.

As stated before, the fourth flag $FLG_{FCT2}$ is set to 0 when the counted value T.TRC of the timer T.TRC is equal to 0, as is clear from the aforesaid steps 511 and 515, etc. Therefore, when the vehicle has shifted to the fuel cut region after staying in the off-standby region for the predetermined time period tTRC or more, the answer to the question of the step 528 should be Yes, and then fuel cut is to be effected in a continuous manner, as hereinafter described. That is, in the case where the vehicle has shifted to the fuel cut region after a long time of stay in the off-standby region, it can be presumed that the vehicle is being accelerated from a state wherein the slip rate assumes a very small value, e.g. 0 or nearly 0 so that it can be predicted that the variation amplitude and variation speed of the slip rate λ will become greater unless no control is made of the fuel supply. Therefore, in such a case, fuel cut is continuously effected to positively reduce the driving force or torque of the engine 31 so as to promptly bring the slip rate λ to a desired value.

A different continuous fuel cut-effecting condition from the above described one may alternatively be provided. For example, such condition is that the throttle valve 33' has been opened from a fully closed state, or the variation rate of throttle valve opening $\Theta_{TH}$ has exceeded a predetermined value, and at the same time the driving wheel(s) 11 and/or 12 are/is in an excessive slip state. When this alternative condition holds, fuel cut may be effected in a continuous manner over a certain period of time, providing substantially the same results as mentioned above.

If the answer to the question of step 528 is No, that is, if the fourth flag $FLG_{FCT4}$ is equal to 1, the program then proceeds to a step 532 wherein it is determined whether the first flag $FLG_{FCT1}$ is equal to 0. As is clear from the aforementioned steps 517 and 530, this first flag is set to 1 during fuel cut in the fuel cut region, and set to 0 in the other regions.

If the answer to the question of step 532 is Yes, that is, if the first flag $FLG_{FCT1}$ is equal to 0, indicating that the present loop is the first loop immediately after transition to the fuel cut region, it is determined at a step 533 whether $F_{CM2}$ signal has been inputted, that is, whether the vehicular speed V is lower than the second predetermined value $V_2$. If $F_{CM2}$ signal has been inputted, that is, $V < V_2$ holds, the program proceeds to a step 534 wherein the second predetermined number $N_1$ selected at step 520 is increased by a fourth predetermined number $N_3$ (e.g. 1), followed by execution of a step 535.

In the step 535, a determination is made as to whether $FCM_1$ signal has been inputted, that is, whether the vehicular speed V is lower than the first predetermined value $V_1$. If $FCM_1$ signal has been inputted, that is, if $V < V_1$ holds, the program proceeds to a step 536 wherein the first predetermined number $N_0$ selected at step 520 is decreased by a third predetermined number $N_2$ (e.g. −1), followed by the program further proceeding to a step 537.

If then answer to the question of step 535 is No, that is, if $FCM_1$ signal has not been inputted, indicating that $V \geq V_1$ holds, or if the answer to the question of step 533 is No, that is, if $FCM_2$ signal has not been inputted so that $V \geq V_2$ stands, the program skips over the aforementioned step 536 to a step 537. As noted above, if $V < V_2$ holds, correction of the first and second predetermined numbers $N_0$ and $N_1$ is effected by deducting $N_2$ from the former and adding $N_3$ to the latter, and if $V_2 \leq V$ holds, correction of the second predetermined number $N_1$ alone is effected by adding $N_3$ to same, while no correction of $N_0$ and $N_1$ is effected if $V \geq V_1$ holds.

In the step 537, a first control variable $CU_{FCT1}$ is set to the first predetermined number $N_0$ which has been selected at step 520 or corrected at step 536, followed by executing a step 538.

If the answer to the question of step 532 is No, that is, if the first flag $FLG_{FCT1}$ is equal to 1, indicating that the present loop is any loop following the first loop immediately after the vehicle has shifted to the fuel cut region, the program jumps to the step 538. That is, the above described steps 532–537 are executed only one time immediately after transition to the fuel cut region.

The step 538 calls for a determination as to whether the first control variable $CU_{FCT1}$ is equal to 0. If the control variable $CU_{FCT1}$ is not equal to 0, the program proceeds to a step 539 wherein a second control variable $CU_{FCT2}$ is set to the second predetermined number $N_1$ which has been selected at step 520 or corrected at step 534. Thereafter, 1 is deducted from the first control variable $CU_{FCT2}$ set as above, followed by execution of the steps 530 and 531 to effect fuel cut [at $E_1$ of $(d)(3)$ of FIG. 6], followed by the program being ended.

If the answer to the question of step 538 is Yes, that is, if the first control variable $CU_{FCT1}$ is equal to 0, it is determined at a step 541 whether the second control variable $CU_{FCT2}$ is equal to 0. If $CU_{FCT2}$ is not equal to 0, the program proceeds to a step 542 wherein 1 is deducted from the second control variable $CU_{FCT2}$. Then, the program proceeds to a step 543 wherein all the correction coefficients but atmospheric pressure-dependent correction coefficient $K_{PA}$ and all the correction variables are set to virtually ineffective values just in the same manner as the aforesaid step 525. Then, the slip control correction coefficient $K_{STB}$ is set to the predetermined value $X_{TRC}$ to be applied in the fuel cut region, selected at step 520 [at $E_2$ of $(d)(3)$ of FIG. 6]. Then, the engine coolant temperature-dependent coefficient $K_{TW}$ is set to 1.0 at a step 545, followed by execution of the step 518 to effect fuel injection by applying these set correction coefficients and correction variables to Equation III, and by ending the program.

If the answer to the question of step 541 is Yes, that is, if the second control variable $CU_{FCT2}$ is equal to 0, the program proceeds to a step 546 wherein the first control variable $CU_{FCT1}$ is set to the first predetermined number $N_0$, as was done in the step 537. This is followed by the steps 540, 530, and 531 to effect fuel cut, and by ending of the program.

It will be learned from the above explanation that even when the vehicle is being driven in the fuel cut region, fuel cut is not effected in a continuous manner if the fourth flag $FLG_{FCT4}$ is equal to 1, but fuel cut over a number of TDC signal pulses equal to the first predetermined number $N_0$ and interruption of fuel cut over a number of TDC signal pulses equal to the second predetermined number $N_1$ are repeatedly alternately effected at E of $(d)(3)$ of FIG. 6. The first flag $FLG_{FCT4}$ is set to 1 when the vehicle stayed in the off-standby region for a time period shorter than the predetermined time period tTRC before shifting to the fuel cut region, as is clear from the steps 511 and 513, etc., or when the vehicle has returned to the fuel cut region from the standby region after shifting to the standby region from the fuel cut region without shifting to the off-standby region, as is clear from the steps 529, 522 and 524, etc. In other words, the first flag $FLG_{FCT4}$ is set to 1 when the slip control mode is changed at relatively short time intervals such that the slip rate $\lambda$ has small variation amplitude and small variation rate. Therefore, on such occasions, it is preferable to effect slip control by alternating effected fuel cut and interruption of same over respective appropriate TDC signal pulse numbers, thereby preventing driving shock due to a sudden drop in the torque of the engine 31 which would be caused if fuel cut is effected in a continuous manner, and hence improving the driveability.

Further, the air-fuel ratio of mixture supplied to the engine 31 is controlled to a leaner value than a normal value by means of the predetermined value $X_{TRC}$ set in dependence on engine rotational speed Ne at the step 520, providing substantially the same results as the aforedescribed control of setting the predetermined value $X_{STB}$ of correction coefficient $K_{STB}$ in dependence on engine rotational speed Ne in the standby region, that is, prevention of excessive temperature rise of three-way catalytic converter 42 and after-fire, and improved driveability.

Also, the first predetermined time number $N_0$ and second predetermined time number $N_1$ which determine the ratio of TDC signal pulse numbers over which fuel cut and interruption of same are effected, respectively, are essentially set in dependence on engine rotational speed Ne, as stated above, thus also providing similar results to the above-mentioned results obtained by setting the predetermined value $X_{STB}$ for standby region and the predetermined value $X_{TRC}$ for fuel cut region.

Although in the foregoing embodiment the first and second predetermined time numbers $N_0$ and $N_1$ are set in dependence on engine rotational speed Ne, this is not limitative, but they may be set in dependence on the slip state of the vehicle, e.g. slip rate $\lambda$ or slip rate variation $\lambda\cdot$. Specifically, the first and second predetermined time numbers $N_0$ and $N_1$ should be set such that the ratio therebetween has an appropriate value to the slip rate $\lambda$ or the slip rate variation $\lambda\cdot$, by taking into consideration the fact that as the slip rate $\lambda$ or the slip rate variation $\lambda\cdot$ is greater, the torque of the engine 31 should be reduced by a greater amount or at a greater rate. This alternative setting of $N_0$ and $N_1$ may make it possible to achieve appropriate air-fuel ratio control in a manner more directly responsive to the actual slip $\lambda$ rate of the vehicle so that the driving force or torque of the engine can be suitably reduced to promptly bring the slip rate $\lambda$, or the slip rate variation $\lambda\cdot$ to a desired value.

(a) and (b) of FIG. 10 show an example of tables of the first and second predetermined time numbers $N_0$ and $N_1$ plotted with respect to slip rate $\lambda$. According to the tables of FIG. 10, the slip rate $\lambda$, is divided into five slip rate regions I–V, for each of which is a predetermined value of each of predetermined time numbers $N_0$ and $N_1$. Specifically, there are provided predetermined values of $\lambda$, i.e. $\lambda_1$, $\lambda_2$, $\lambda_3$, and $\lambda_4$ (e.g. 15%, 20%, 25%, and 30%, respectively), defining respective regions I, II, III, IV, and IV, for respective ones of which regions there are provided predetermined values $N_{01}$, $N_{02}$, $N_{03}$, $N_{04}$, and $N_{05}$ of $N_0$ (e.g. 1, 2, 3, 4, and 255, respectively), and predetermined values $N_{11}$, $N_{12}$, $N_{13}$, $N_{14}$ and $N_{15}$ (e.g. 1, 2, 3, 3, and 0, respectively).

(a) and (b) of FIG. 11 show an example of tables of the first and second predetermined time numbers N 0 and N, plotted with respect to slip rate variation $\lambda\cdot$. According to the tables of FIG. 11, the slip rate variation $\lambda\cdot$, is divided into five slip rate regions I–V, for each of which is a predetermined value of each of predetermined time numbers $N_0$ and $N_1$. Specifically, there are provided predetermined values of $\lambda\cdot$, i.e. $\lambda\cdot_1$, $\lambda\cdot_2$, $\lambda\cdot_3$, and $\lambda\cdot_4$ (e.g. 30%/sec, 40%/sec, 60%/sec, and 80%/sec, respectively), defining respective regions I, II, III, IV, and IV, for respective ones of which regions there are provided predetermined values $N_{01}$, $N_{02}$, $N_{03}$, $N_{04}$, and $N_{05}$ of $N_0$ (e.g. 1, 2, 3, 4, and 255, respectively), and predetermined values $N_{11}$, $N_{12}$, $N_{13}$, $N_{14}$, and $N_{15}$ (e.g. 1, 2, 3, 3, and 0, respectively).

The tables of FIG. 10 or FIG. 11 may be applied in the step 520 in FIG. 5 in place of the tables in FIG. 7, to determine the values of $N_0$ and $N_1$.

Furthermore, instead of setting the predetermined values $X_{STB}$ and $X_{TRC}$, and the predetermined time numbers $N_0$ and $N_1$ in dependence on engine rotational speed Ne as in the embodiment described above, these values may be set in dependence on other operating parameters of the engine such as load on the engine, e.g. absolute pressure $P_{BA}$ in the intake pipe or the opening $\Theta_{TH}$ of the throttle valve, in addition to or in lieu of Ne. By so setting $N_0$ and $N_1$ based upon load on the engine, the ratio between fuel cut period and fuel cut-interruption period can conform to engine load represented by the above parameter $P_{BA}$ or $\Theta_{TH}$. This alternative setting is advantageous in overcoming the problem with the prior art that since the amount of drop in the driving force or torque of the engine 31 is different depending upon the magnitude of load on the engine, if the above predetermined values and/or predetermined time numbers are so set that the target air-fuel ratio is appropriate to a high load operating condition of the engine, the slip control will be effected to an excessive extent when the engine is operating in a low load operating condition, whereas if they are so set that the target air-fuel ratio is appropriate to a low load operating condition of the engine, the slip control will be effected to an insufficient extent when the engine is operating in a high load operating condition. Therefore, by setting the values $X_{STB}$, $X_{TRC}$, and $N_0$ and $N_1$ based upon engine load, it will be possible to achieve proper air-fuel ratio control and hence proper slip control throughout the entire engine load region, thereby securing satisfactory driveability. If the predetermined values and/or predetermined time numbers are set based upon both engine rotational speed Ne and intake pipe absolute pressure $P_{BA}$, they may be set by means of maps with Ne and $P_{BA}$ as setting factors.

(a)–(d) of FIG. 12 show examples of these tables. According to FIG. 12, each table is divided into five intake pipe absolute pressure regions, for each of which is provided a predetermined value of each of $X_{STB}$, $X_{TRC}$, $N_0$ and $N_1$. More specifically, four predetermined values $P_{BA1}$, $P_{BA2}$, $P_{BA3}$, and $P_{BA4}$ of intake pipe absolute pressure $P_{BA}$ (e.g. 200mmHg, 350mmHg, 450mmHg, and 600mmHg, respectively) are provided and define respective intake pipe absolute pressure regions, i.e. a region I corresponding to less than $P_{BA1}$, a region II to $P_{BA1}-P_{BA2}$, a region III to $P_{BA2}-P_{BA3}$, a region IV to $P_{BA3}-P_{BA4}$, and a region V to $P_{BA4}$ and more, respectively. As predetermined value $X_{STB}$ to be applied in standby region, there are provided values $X_{STB1}$, $X_{STB2}$, $X_{STB3}$, $X_{STB4}$ and $X_{STB5}$ (e g. 0.50, 0.60, 0.80, 0.80, and 1.70, respectively), to be applied in respective regions I–V. Similarly, as predetermined value $X_{TRC}$ to be applied in fuel cut region, and first and second predetermined time numbers $N_0$ and $N_1$, there are provided $X_{TRC1}-X_{TRC5}$ (e.g. 0.35, 0.40, 0.40, 0.45, and 0, respectively) as $X_{TRC}$, $N_{01}-N_{05}$ (e.g. 1, 2, 3, 4, and 255, respectively) as $N_0$, and $N_{11}-N_{15}$ (e.g. 1, 2, 3, 3, and 0, respectively) as $N_1$. The tables of FIG. 12 may also be applied in the step 520 of FIG. 5, in place of the tables of FIG. 7.

Figure 13:
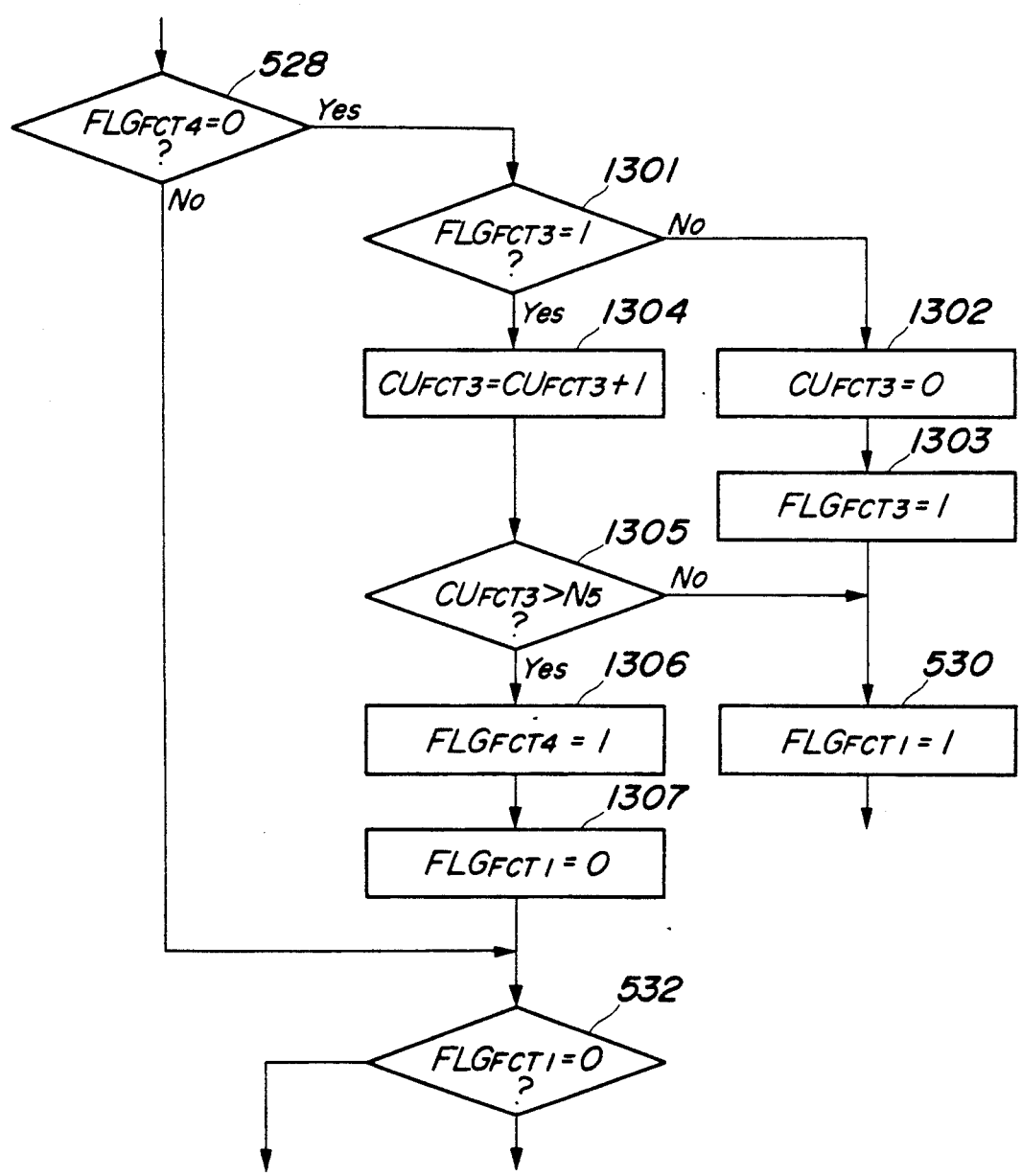
FIG. 13 is a fragmentary flowchart showing a variation of part of the control program of FIG. 5.

Still further, the alternate fuel cut and fuel cut interruption may be effected in various manners, besides the manner described above. For example, the first and second predetermined time numbers $N_0$ and $N_1$ may be set in dependence on the speed of the trailing wheels. Moreover, the ratio between fuel cut period and fuel cut-interruption period may be a fixed value, instead of using TDC signal pulses. This can simplify the control system. FIG. 13 shows another example of slip control, which is identical with the control program of FIG. 5 in effecting slip control in dependence on generation of the fuel cut signal, the standby signal, etc. and in response to engine operating parameters. The control program of FIG. 13 is also executed whenever the TDC signal is inputted to the ECU 35. The control program of FIG. 13 is different only in part from that of FIG. 5, and therefore in FIG. 13, only the different portion and its adjacent common parts are shown, the steps of the common parts being designated by identical reference numerals with those in FIG. 5.

The control program of FIG. 13 is distinguished from that of FIG. 5 in steps executed when the answer to the question of step 528 in FIG. 5 is Yes, i.e. when the vehicle remains in the off-standby region for the predetermined time period tTRC or more before shifting to the fuel cut region. When the answer to the question of step 528 is Yes, the program proceeds to a step 1301 wherein it is determined whether the third flag $FLG_{FCT3}$ is equal to 1. If the answer is No, i.e. if the third flag $FLG_{FCT3}$ is equal to 0, that means the present loop is the first loop immediately after the vehicle has shifted to the fuel cut region, the program proceeds to a step 1302 wherein the third control variable $CU_{FCT3}$ is set to 0, and followed by a step 1303 wherein the third flag $FLG_{FCT3}$ is set to 1. Thereafter the steps 530 and 521 in FIG. 5 are executed to effect fuel cut, followed by ending of the program.

If the answer to the question of step 1301 is Yes, that is, if the third flag $FLG_{FCT3}$ is equal to 1, indicating that the present loop is any loop subsequent to the first loop immediately after the vehicle has shifted to the fuel cut region, the program proceeds to a step 1304 wherein the third control variable $CU_{FCT3}$ is increased by 1, and then it is determined at a step 1305 whether the third control variable $CU_{FCT3}$ thus increased is greater than a sixth predetermined time number $N_5$. This sixth predetermined time number $N_5$ is set at a value greater than the first predetermined time number $N_0$, in dependence on engine rotational speed Ne, engine load, or the speed of trailing wheels, like the first and second predetermined time numbers $N_0$ and $N_1$. If the answer to the question of step 1305 is No, that is, if $CU_{FCT3} \leq N_5$ holds, which means the number of loops executed after the transition to the fuel cut region is less than $N_{5+1}$, the steps 530 and 531 are executed to continue fuel cut, followed by the program being ended.

If the answer to the question of step 1305 is Yes, that is, if $CU_{FCT3} > N_5$ holds, indicating that the number of loops executed after the transition to the fuel cut region exceeds the sum $N_{5+1}$, the fourth flag $FLG_{FCT4}$ <is set to 1 at a step 1306, and the first flag $FLG_{FCT1}$ is set to 0 at a step 1307, and then the program proceeds to the step 532 in FIG. 5. Since the fourth flag $FLG_{FCT4}$ has been set to 1 as noted above, the answer to the question of step 528 should be No in the next loop, and accordingly, the program should proceed to the step 532 as in the control program of FIG. 5.

As stated above, if the vehicle shifts to fuel cut region after staying in the off-standby region for the predetermined time period $t_{TRC}$ or more, as distinct from the FIG. 5 program wherein fuel cut is continued as long as the vehicle remains in the fuel cut region, in the FIG. 13 program the fuel cut is continued only over a time period corresponding to the number of TDC signals $(=N_{5+1})$ generated immediately after transition to the fuel cut region, and thereafter alternate fuel cut and fuel supply are repeatedly effected. Like the control manner of FIG. 5, the control manner of FIG. 13 makes it possible to positively reduce the driving force or torque of the engine 31 so as to promptly bring the slip rate $\lambda$· to a desired value. The other steps than those shown in FIG. 13 are identical with the corresponding steps in FIG. 5, description of which are therefore omitted.

Figure 14:
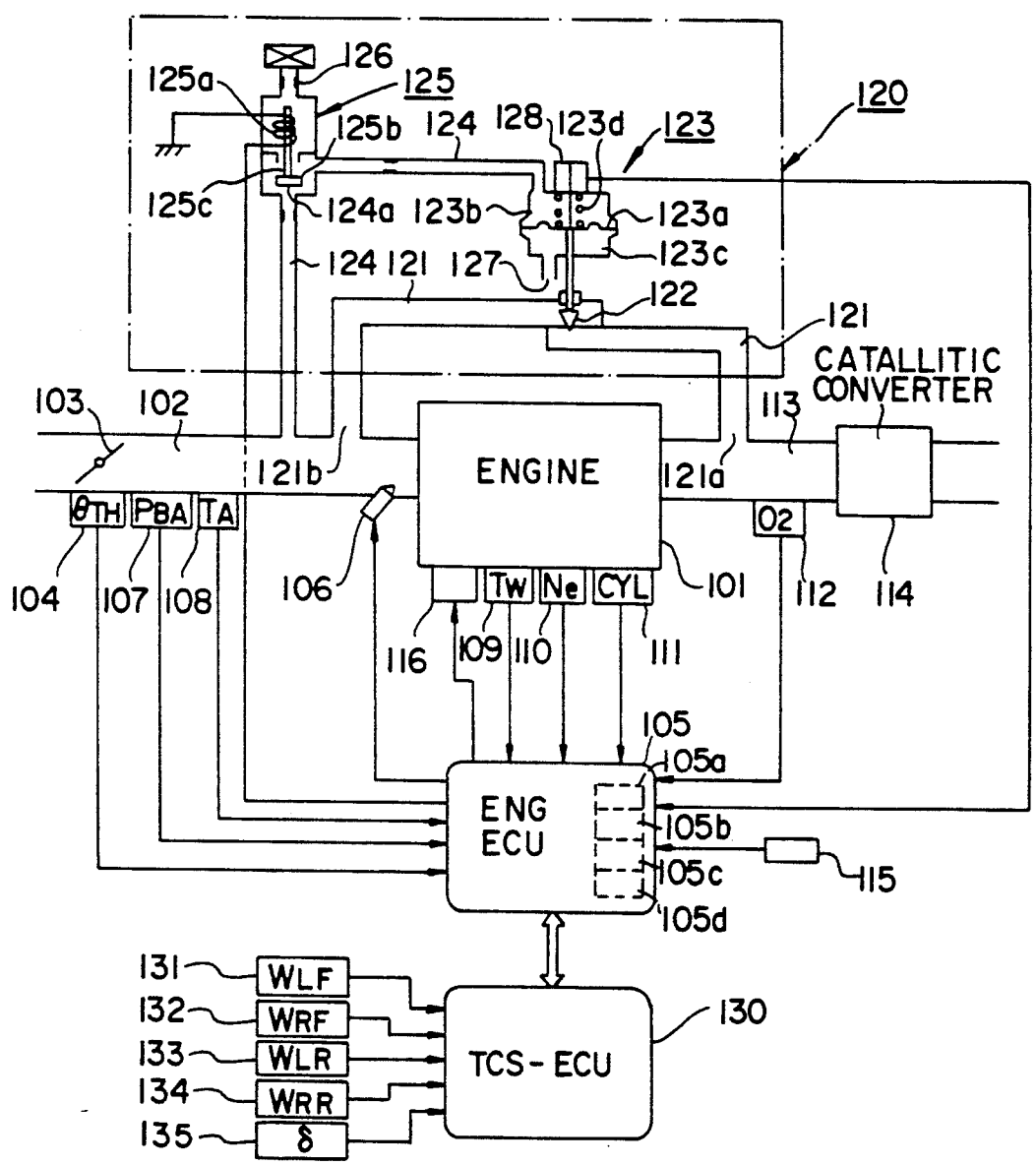
FIG. 14 is a schematic diagram illustrating an overall arrangement of a second embodiment of the slip control system according to the instant invention, including an EGR (exhaust gas recirculation) system.

A second embodiment of the invention will now be described with reference to FIGS. 14–24. Referring first to FIG. 14, there is illustrated the whole arrangement of a driving wheel slip control system according to the embodiment of the invention. A throttle body is provided in an intake pipe 102 connected to a multi-cylinder engine 101 (for example, six cylinders) and has a throttle valve 103 positioned therein. A throttle valve opening ($\Theta$th) sensor 104 is connected to the throttle valve 103 for detecting the valve opening ($\Theta$th) of the throttle valve 103 and converting the same into an electrical signal which is supplied to an electronic control unit for controlling fuel supply (hereinafter referred to as "the ENG-ECU") 105.

A fuel injection valve 106 is arranged in the intake pipe 102 at a location between the engine 101 and the throttle valve 103. Fuel injection valves 106 are each located slightly upstream of an intake valve (or intake valves), not shown, of each cylinder. The fuel injection valves 106, which are connected to a fuel pump, not shown, are electrically connected to the ENG-ECU 105, and the valve opening time period of each valve is controlled by a signal from the ENG-ECU 105.

An absolute pressure ($P_{BA}$) sensor 107 communicates through with the interior of the intake pipe 102 at a location immediately downstream of the throttle valve 103. The absolute pressure sensor 107 detects absolute pressure in the intake pipe 102 and supplies an electrical signal indicative of the detected absolute pressure to the ENG-ECU 105. An intake air temperature ($T_A$) sensor 108 is provided in intake pipe 102 for supplying the ENG-ECU 105 with an electrical signal indicative of the detected engine intake air temperature ($T_A$).

An engine coolant temperature ($T_W$) sensor 109, which may be formed of a thermistor or the like, is mounted in the cylinder block of the engine 101, detects engine coolant temperature ($T_W$) and supplies an electrical signal indicative of the detected engine coolant temperature ($T_W$) to the ENG-ECU 105. An engine speed (Ne) sensor 110 and a cylinder-discriminating (CYL) sensor 111 are connected to a crankshaft or a camshaft, neither of which is shown, of the engine. The engine speed sensor 110 outputs a crank angle position signal pulse (hereinafter referred to as "TDC" signal pulse") at a predetermined crank angle position per every 180° rotation of the crankshaft of the engine, and the cylinder-discriminating sensor 111 outputs a signal pulse at a predetermined crank angle position of a particular cylinder. These signal pulses are transmitted to the ENG-ECU 105.

A three-way catalytic converter 114 is disposed in an exhaust pipe 113 and performs purging of HC, CO and NOx components in the exhaust gases. On the upstream side of the catalytic converter 114, an $O_2$ sensor 112 as an exhaust gas ingredient concentration sensor is disposed in the exhaust pipe 113. The $O_2$ sensor 112 detects the concentration of oxygen in the exhaust gases and transmits a signal indicative of the detected $O_2$ concentration to the ENG-ECU 105.

Further, connected to the ENG-ECU 105 is an electronic control unit for detecting a driving wheel slip (hereinafter referred to as "the TCS-ECU") 130. Connected to the TCS-ECU 30 are driving wheel speed sensors 131, 132 for detecting the rotational speeds $W_{FR}$, $W_{LF}$ of respective right and left driving wheels, not shown, trailing wheel speed sensors 133, 134 for detecting the rotational speeds $W_{RR}$, $W_{LR}$ of respective right and left trailing wheels, not shown, and a steering sensor 135 for detecting the steering angle $\delta$ of a steering wheel, not shown. These sensors 131 to 135 transmit output signals to the TCS-ECU 130. The steering sensor 135 outputs an absolute angle value, i.e. positive angles ($+1°$, $+2°$, ...) in the case of rightward steering and negative angles ($-1°$, $-2°$, ...) in the case of leftward steering with the neutral point being zero degrees.

The engine 101 is also provided with an exhaust recirculation mechanism 120 constituting part of the exhaust gas recirculation control system. The mechanism 120 has an exhaust recirculation passageway 121. The latter has an end 121a communicating with the interior of the exhaust pipe 113 upstream of the three-way catalytic converter 114 and the other end 121b communicating with the interior of the intake pipe 102 downstream of the throttle valve 103. An exhaust recirculation is arranged in the exhaust recirculation passageway 121 at a point intermediate ends 21a and 21b. The exhaust recirculation valve 122 is operatively connected to a diaphragm 123a of a negative pressure-responsive device 123. The latter has a negative pressure chamber 123b and a lower chamber 123c defined by the diaphragm 123a. A spring 123d installed in a compressed state in the negative pressure chamber 123b urges the diaphragm 123a in a direction that closes the exhaust return valve 122. The lower chamber 123c communicates with the atmosphere through an air passageway 127, and the negative pressure chamber 123b communicates with the interior of the intake pipe 102 downstream of the throttle valve 103 through a negative pressure passageway (or vacuum line) 124 having a restriction.

A three-way electromagnetic valve 125 is arranged in the negative pressure passageway 124 at a point along its length. The three-way valve 125 has a solenoid 125a, a valve body 125b and an aperture 125c communicating with the atmosphere through an atmosphere passageway 126 having a filter and a restriction. When the solenoid 125a is energized, the valve body 125b closes the aperture 125c and opens the negative pressure passageway 124, thereby introducing the negative pressure inside intake pipe 102 downstream of the throttle valve 103 to the negative pressure chamber 123b of the negative pressure-responsive device 123. As a result, a pressure differential is produced across the diaphragm 123a, so that the diaphragm 123a is displaced against the force of spring 123d to open the exhaust recirculation valve 122.

Thus, when the solenoid 125a of the three-way electromagnetic valve 125 is energized with an increased duty ratio, the return valve 122 is opened to a substantially wider degree to permit some of the exhaust gases to be returned in a larger quantity to the intake pipe 102 via the exhaust recirculation passageway 121. When the solenoid 125a of three-way electromagnetic valve 125 is deenergized, on the other hand, the valve body 125b closes off an opening 124a in the negative pressure passageway 124 and opens the aperture 125c, as a result of which the atmosphere is introduced to the negative pressure chamber 123b of the negative pressure-responsive device 123. At such time the pressure differential across the diaphragm 123a becomes approximately zero, so that the diaphragm 123a is urged and displaced by the spring 123d, thereby moving the exhaust return valve 122 in the closing direction. If the duty ratio is set to zero so that the solenoid 125a of three-way electromagnetic valve 125 is kept deenergized continuously, the return valve 122 will be fully closed to cut off the flow of returning exhaust gases. The solenoid 125a of three-way valve 125 is electrically connected to the ECU 105.

The mechanism 120 further includes a valve lift sensor 128 coupled to the diaphragm 123a of the negative pressure-responsive device 123 for sensing the amount of deviation of diaphragm 123a, namely the degree to which the valve 122 actually opens. This sensor 128 is also electrically connected to the ECU 105.

The ECU 105 determines what the operating condition of the engine 101 is based on engine operating parameter signals from aforementioned sensors when the exhaust recirculation control system has started, and supplies the three-way electromagnetic valve 125 with an on/off duty signal so as to nullify an offset between a command value $L_{CMD}$ from ENG-ECU 105 specifying the degree to which the exhaust recirculation valve 122 is to be opened and an actual valve opening valve $L_{CMD}$ indicating the degree to which the valve 122 actually opens. The valve opening command value $L_{CMD}$ is set as a function of the absolute pressure $P_{BA}$ inside the intake manifold and the engine rotational speed Ne, and the actual valve opening value $L_{ACT}$ is sensed by the valve lift sensor 128.

In this embodiment of the invention, the ENG-ECU 105 constitutes part of excessive slip sensing means, fuel supply control means, first and second leaning means, and fuel cut-off means, while the TCS-ECU 130 constitutes part of the excessive slip sensing means.

The ENG-ECU 105 includes an input circuit 105a having functions of shaping pulse waveforms of input signals from some engine operating parameter sensors and the TSC-ECU 130, shifting the voltage levels of input signals from other engine operating parameter sensors to a predetermined voltage level, converting the voltage-shifted analog signals into digital signals, etc., a central processing unit (hereinafter referred to as "the CPU") 105b, memory means 105c storing control programs executed in the CPU 105b, and an output circuit 105d for supplying driving signals to the fuel injection valves 106.

The CPU 105b operates in response to various engine operating parameter signals stated above, to determined operating conditions or operating regions in which the engine is operating, such as a feedback control region in which the air-fuel ratio is controlled to a stoichiometric value based on the O₂ sensor, and open loop control regions, and then to calculate the fuel injection period $T_{OUT}$ for which the fuel injection valves 106 should be opened, in accordance with the determined operating conditions or regions of the engine and in synchronism with generation of TDC signal pulses, by the use of the following equation (IX).

$$T_{OUT}=T_i\times K_i\times K_{TCS}+K_2 \quad (IX)$$

where $T_i$ represents a basic value of the fuel injection period $T_{OUT}$ for the fuel injection valves 106, and is determined in accordance with the engine rotational speed Ne and the intake pipe absolute pressure $P_{BA}$.

$K_{TCS}$ is a leaning correcting coefficient which is set to a value smaller than 1.0 as described below when the excessive slip state of a driving wheel is detected, and is set to a value of 1.0 when the excessive slip state of a driving wheel is not detected.

$K_1$ and $K_2$ are other correction coefficients and correction variables, respectively, and are calculated based on various engine parameter signals to such values as optimize engine characteristics, such as fuel consumption and engine accelerability, in accordance with the engine operating conditions.

The CPU 105b supplies driving signals to the fuel injection valves 106 by way of the output circuit 105d to open the valves over the thus calculated fuel injection period $T_{OUT}$.

Figure 15:
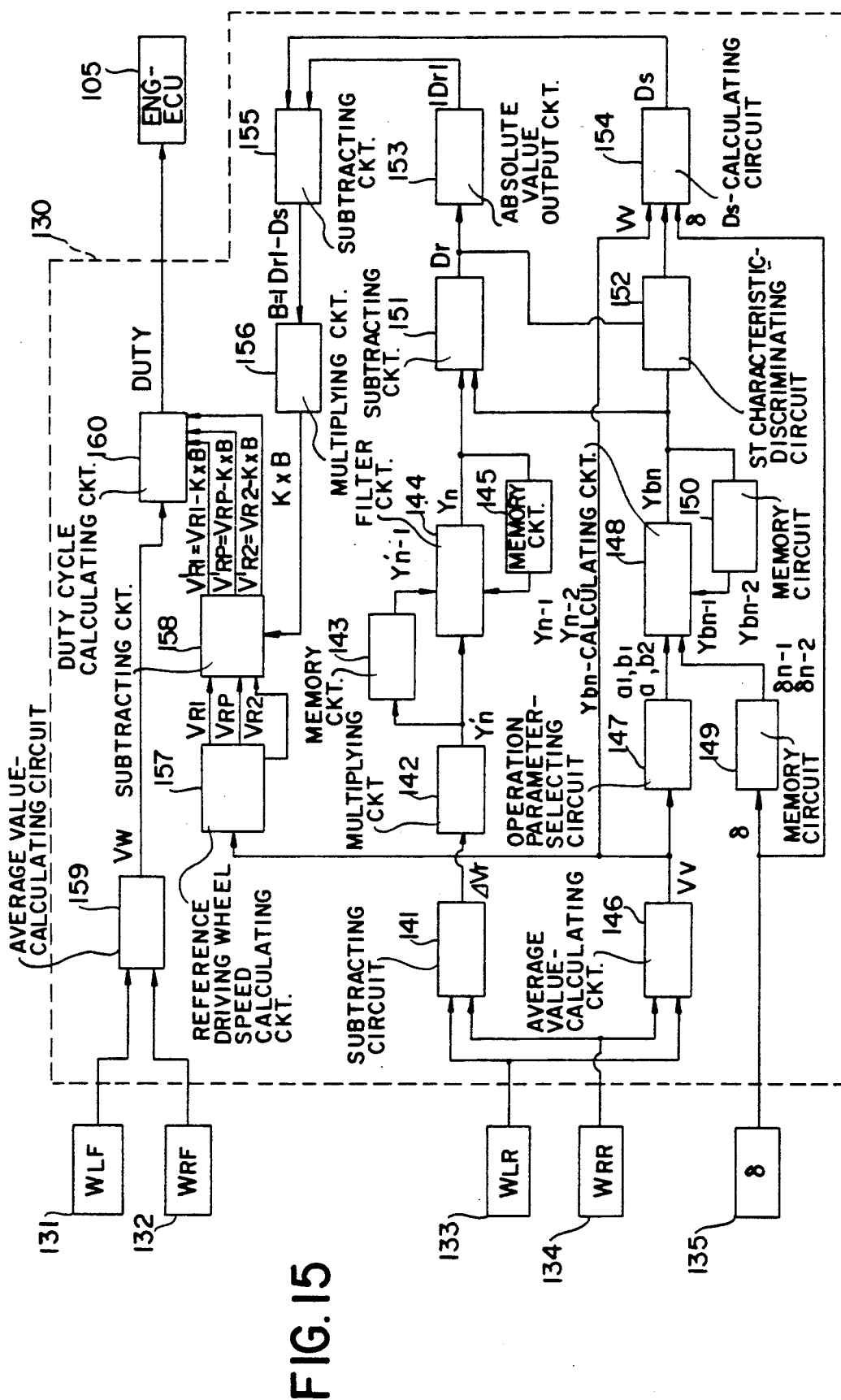
FIG. 15 is a block diagram of the TCS-ECU of FIG. 14.

FIG. 15 is a block diagram showing the arrangement of the inside of the TCS-ECU 130. Output signals from the right and left trailing wheel speed sensors 133, 134 are supplied to a first subtracting circuit 141 and a first average value-calculating circuit 146. The first subtracting circuit 141 calculates the speed difference $\Delta Vr$ ($=W_{LR}-W_{RR}$) between the rotational speeds $W_{LR}$, $W_{RR}$ of the left and right trailing wheels, and supplies a signal indicative of the speed difference $\Delta Vr$ to a first multiplying circuit 142. The first multiplying circuit 142 calculates an approximate value of yaw rate $Y'_n$ ($=Vr\times d$) by multiplying the speed difference $\Delta Vr$ by the track d (e.g. d=1.2 m) between the right and left trailing wheels, and supplies a signal indicative of the approximate value of yaw rate $Y'_n$ to a first memory circuit 143 and a filter circuit 144. The first memory circuit 143 stores the approximate value of yaw rate $Y'_n$ and supplies an immediately preceding approximate value of yaw rate $Y'_{n-1}$ to the filter circuit 144. The subscripts $_n$ and $_{n-1}$ represent, respectively, the present and immediately preceding loops of the filtering operation which is repeated by the filter circuit 144 in a fixed cycle.

The filter circuit 144 provides yaw rate $Y_n$ by filtering the approximate value of yaw rate $Y'_n$. Connected to the output side of the filter circuit 144 is a second memory circuit 145, which stores the output $Y_n$ from the filter circuit 144 and supplies a value $Y'_{n-1}$ of the immediately preceding loop and a value $Y'_{n-2}$ of the loop before the immediately preceding loop to the filter circuit 144. The filter circuit 144 calculates the yaw rate $Y_n$ by applying the aforesaid input signals $Y'_n$, $Y'_{n-1}$, $Y_{n-1}$, and $Y_{n-2}$ to the following equation (X), and supplies a signal indicative of the yaw rate $Y_n$ to a second subtracting circuit 151.

$$Y_n=\alpha_1\times Y'_n+\alpha_2\times Y'_{n-1}+\beta_1\times Y_{n-1}+\beta_2\times Y_{n-2} \quad (X)$$

where $\alpha_1$, $\alpha_2$, $\beta_1$, and $\beta_2$ are constants which are experimentally determined.

The filter circuit 144 is a recursive low-pass filter and employed for eliminating the influence of the vibration of automotive suspensions on the rotational speeds $W_{LR}$, $W_{RR}$ of the left and right trailing wheels. Specifically, the frequency of fluctuation of the rotational speeds $W_{LR}$, $W_{RR}$ of the left and right trailing wheels caused by the resonance of the left and right trailing wheels with the vibration of the automotive suspensions when the vehicle is running on a rough road is approximately 10 Hz, whereas the range of frequency of the yaw rate used for controlling the motion of the vehicle is approximately 0 to 2 Hz. Therefore, the filter circuit 144 is adapted to filter the approximate value $Y'_n$ of yaw rate so as to attenuate the range of frequencies of 3 Hz or more. The yaw rate $Y_n$ is an estimated value of the actual rate of yaw about the center of gravity of the vehicle, and assumes a positive value when the vehicle turns to the right, and a negative value when it turns to the left.

The first average value-calculating circuit 146 calculates an average value $V_v$ $(=(W_{LR}+W_{RR})/2)$ of the rotational speeds $W_{LR}$, $W_{RR}$ of the left and right trailing wheels as a vehicle speed, and supplies the calculated value to an operation parameter-selecting circuit 147, a reference difference $(D_s)$-calculating circuit 154, and a reference driving wheel speed calculating circuit 157. The operation parameter-selecting circuit 147 selects, in accordance with the vehicle speed $V_v$, the values of operation parameters $a_1$, $a_2$, $b_1$, and $b_2$ used for calculation by a reference yaw rate (Ybn)-calculating circuit 148 which is connected to the output side of the operation parameter-selecting circuit 147, and supplies the selected values to the reference yaw rate $(Y_{bn})$-calculating circuit 148.

In the meanwhile, the output side of the steering sensor 135 is connected to a third memory circuit 149, which stores a detected value of steering angle $\delta$, and supplies a steering angle value $\delta_{n-1}$ of the immediately preceding loop and a steering angle value $\delta_{n-2}$ of the loop before the immediately preceding loop to the reference yaw rate $(Y_{bn})$, and supplies stored values $Y_{bn-1}$ and $Y_{bn-2}$ of the immediately preceding loop and the loop before the immediately preceding loop to the reference yaw rate $(Y_{bn})$-calculating circuit 148. The reference yaw rate $(Y_{bn})$ calculating circuit 148 calculates an ideal yaw rate value, i.e. reference yaw rate $(Y_{bn})$ based on the variation history of steering angle $(\delta_{n-1}, \delta_{n-2})$ and the variation history of reference yaw rate itself $(Y_{bn-1}, Y_{bn-2})$ by the use of the following physical model equation (XI), and supplies the calculated value of reference yaw rate $(Y_{bn})$ to the second subtracting circuit 151 and a steering characteristic-discriminating circuit 152.

$$Y_{bn}=a_1\times\delta_{n-1}+a_2\times\delta_{n-2}-b_1\times Y_{bn-1}-b_2\times Y_{bn-2} \quad (XI)$$

The reference yaw rate $(Y_{bn})$ is used as a signal indicative of an ideal yaw rate value which assumes a positive value when the vehicle turns to the right and a negative value when the vehicle turns to the left, like the yaw rate $Y_n$.

The second subtracting circuit 151 calculates a difference $D_r$ $(=Y_n-Y_{bn})$ between the value of yaw rate $Y_n$ obtained by the equation (2) and the value of reference yaw rate $Y_{bn}$, and supplies a signal indicative of the calculated difference $D_r$ to the steering characteristic-discriminating circuit 152 and an absolute value output circuit 153. The absolute value output circuit 153 supplies an absolute value $|D_r|$ of the difference $D_r$ to a third subtracting circuit 155. The steering characteristicdiscriminating circuit 152 determines the steering characteristic as follows, based on the value of reference yaw rate $Y_{bn}$ and the difference $D_r$, and supplies the result to the reference difference $(D_S)$-calculating circuit 154.

(1) If $Y_{bn}>0$ and $D_r>0$, or if $Y_{bn}<0$ and $D_r<0$, it is determined that the vehicle is in a state of oversteer.

(2) If $Y_{bn}<0$ and $D_r>0$, or if $Y_{bn}>0$ and $D_r<0$, it is determined that the vehicle is in a state of understeer.

The reference difference $(D_s)$-calculating circuit 154 is supplied with a signal indicative of the result of the steering characteristic discrimination, a signal indicative of a value of the vehicle speed $V_v$, and a signal indicative of a value of the steering angle $\delta$ detected by the steering sensor 135. The reference difference $(D_s)$-calculating circuit 154 calculates the reference difference $D_s$ based on these input signals and supplies a signal indicative of a value of the reference difference $D_s$ to the third subtracting circuit 155. The reference difference $D_s$ is a reference value of the yaw rate difference $D_r$ calculated based on the vehicle speed $V_v$, the steering angle $\delta$, and the steering characteristic, and is set to a greater value as the vehicle speed decreases and at the same time the steering angle $\delta$ increases. This is because when the trailing wheel speed or the vehicle speed is lower and the steering angle $\delta$ is greater, the difference $D_r$ between the reference yaw rate $Y_{bn}$ and the yaw rate $Y_n$ is increased, since the steering characteristic of the vehicle varies in a non-linear manner, whereas the reference yaw rate $Y_{bn}$ calculated at the reference yaw rate-calculating circuit 148 varies in a linear manner. Further, in the case of a front drive type vehicle, if an excessive driving force is applied to wheels while the vehicle is turned to the left or the right, there is a tendency that the vehicle is brought into understeering. Therefore, if the result of discrimination carried out at the steering characteristic-discriminating circuit 152 indicates that the vehicle is in the state of understeering, the reference difference $D_s$ is decreased. This brings about such a result that a deviation B $(=|D_r|-D_s)$ of the absolute value $|D_r|$ of the yaw rate difference is increased, and ultimately the engine output is decreased, thereby bringing the vehicle out of understeering. On the other hand, in the case of a rear drive type vehicle, if an excessive driving force is applied to wheels, there is a tendency that the vehicle is brought into oversteering. Therefore, in contrast with the aforesaid case of a front drive type vehicle, the reference difference $D_s$ is decreased such that the engine output is decreased when the oversteering condition is detected.

The third subtracting circuit 155 calculates the deviation B $(=|Dr|-Ds)$ of the absolute value $|Dr|$ of the yaw rate difference, and supplies a signal indicative of the deviation B to a second multiplying circuit 156. The second multiplying circuit 156 multiplies the deviation B by a predetermined constant K to thereby calculate a correction term $K\times B$ for correcting a reference driving wheel speed $V_{ref}$ referred to hereinafter and then supply a signal indicative of the correction term $K\times B$ to a fourth subtracting circuit 158.

Figure 16:
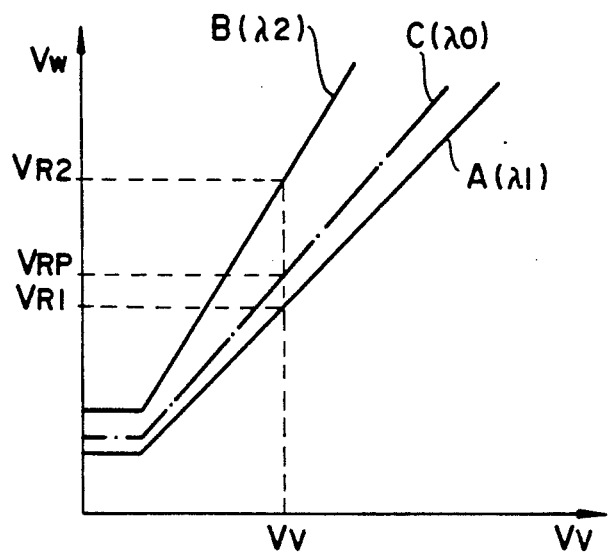
FIG. 16 is a graph illustrating reference velocities $V_{R1}$, $V_{RP}$ and $V_{R2}$ based upon vehicle speed $V_V$.

The average value of trailing wheel speeds calculated at the first average value-calculating circuit 146, (i.e. the vehicle speed $V_v$) is supplied to the reference driving wheel speed calculating circuit 157 which calculates reference driving wheel speeds (desired value of driving wheel speed) $V_{R1}$, $V_{RP}$, $V_{R2}$ based on the vehicle speed $V_v$, and supplies signals indicative of the reference driving wheel speed $V_{R1}$, $V_{RP}$, $V_{R2}$ to the fourth subtracting circuit 158. The reference driving wheel speeds $V_{R1}$, $V_{RP}$, $V_{R2}$ are determined as illustrated in FIG. 16. Each of lines A, B and C corresponds with the values of constant slip rates $\lambda_1$, $\lambda hd 2$ and $\lambda_0$, respectively. The slope of each line is proportional to the corresponding slip rate. The reference driving speeds $V_{R1}$, $V_{RP}$, $V_{R2}$ can be calculated according to the following equations:

$$V_{R1}=V_V/(1-\lambda_1) \quad (XII)$$

$$V_{RP}=V_V/(1-\lambda_0) \quad (XIII)$$

$$V_{R2}=V_V/(1-\lambda_2) \quad (XIII)$$

Figure 17:
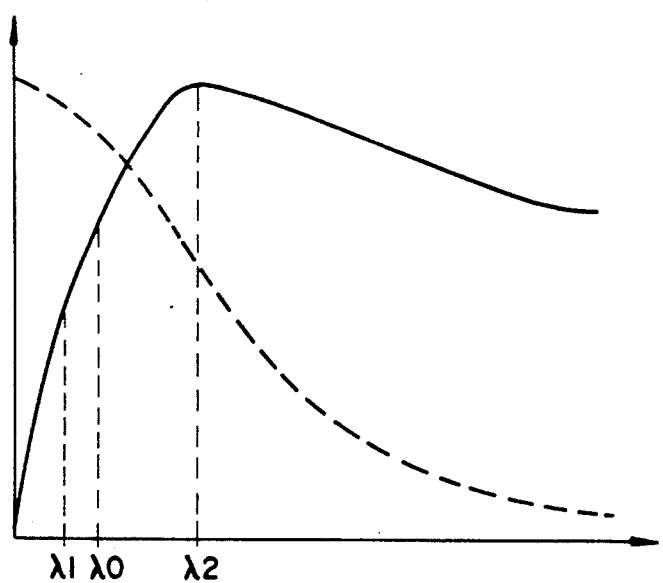
FIG. 17 is a graph illustrating the relationship between the slip rate of a driving wheel tire of a vehicle and the frictional force between the tire and the road surface.

Thus, as illustrated in FIG. 16, based upon the vehicle speed $V_V$ and the slip rates as shown in FIG. 17, the reference driving wheel speeds may be determined. The fourth subtracting circuit 158 subtracts the correction term K×B from each reference driving wheel speed $V_{R1}$, $V_{RP}$, $V_{R2}$ input from the Vref calculating circuit 157 to thereby correct the reference driving wheel speed $V_{ref}$, and supplies a signal indicative of the corrected reference driving wheel speeds $V'_{R1}$ (=$V_{R1}$−K×B), $V'_{RP}$ (=$V_{RP}$−K×B), and $V'_{R2}$ (=$V_{R2}$−K×B), respectively to a duty cycle generating circuit 160.

In the meanwhile, signals from the left and right driving wheel speed sensors 131, 132 are supplied to a second average value-calculating circuit 159. The second average value-calculating circuit 159 calculates an average value $V_W$ (=$W_{LF}+W_{RF}$)/2) of the left and right driving wheel speeds, and supplies a signal indicative of the average value $V_W$ to the duty cycle calculating circuit 160. The duty cycle generating circuit 160 calculates a duty cycle signal which is supplied to the ENG-ECU 105 for properly controlling the slip of a driving wheel. Specifically, the duty cycle (DUTY) is calculated according to the following equation:

$$\text{DUTY} = (V_{RP} - V_{R1}) / (V_{R2} - V_{R1}) + D_{PID} \quad (XV)$$

where $D_{PID}$ is calculated based upon a PID calculation in relation to $V_{RP}$ as a reference wheel speed and $V_W$ as an actual wheel speed. The PID calculation relates to a common process for feedback control, wherein the "P" term $D_P$ relates to a difference of displacement from a specified reference (this is a present quantity), the "I" term $D_I$ is an integration term and relates to, for example, the area under a curve representing an actual value compared with a reference (this is a past or historical value), and the "D" term $D_D$ is a differential term which relates to the rate of change (this is a future or predictive term). Therefore, by controlling the engine output based on the duty cycle (DUTY), it becomes possible to properly control the driving wheel slip and the yawing of the vehicle over wide ranges of vehicle speed and steering angle.

Figure 18A:
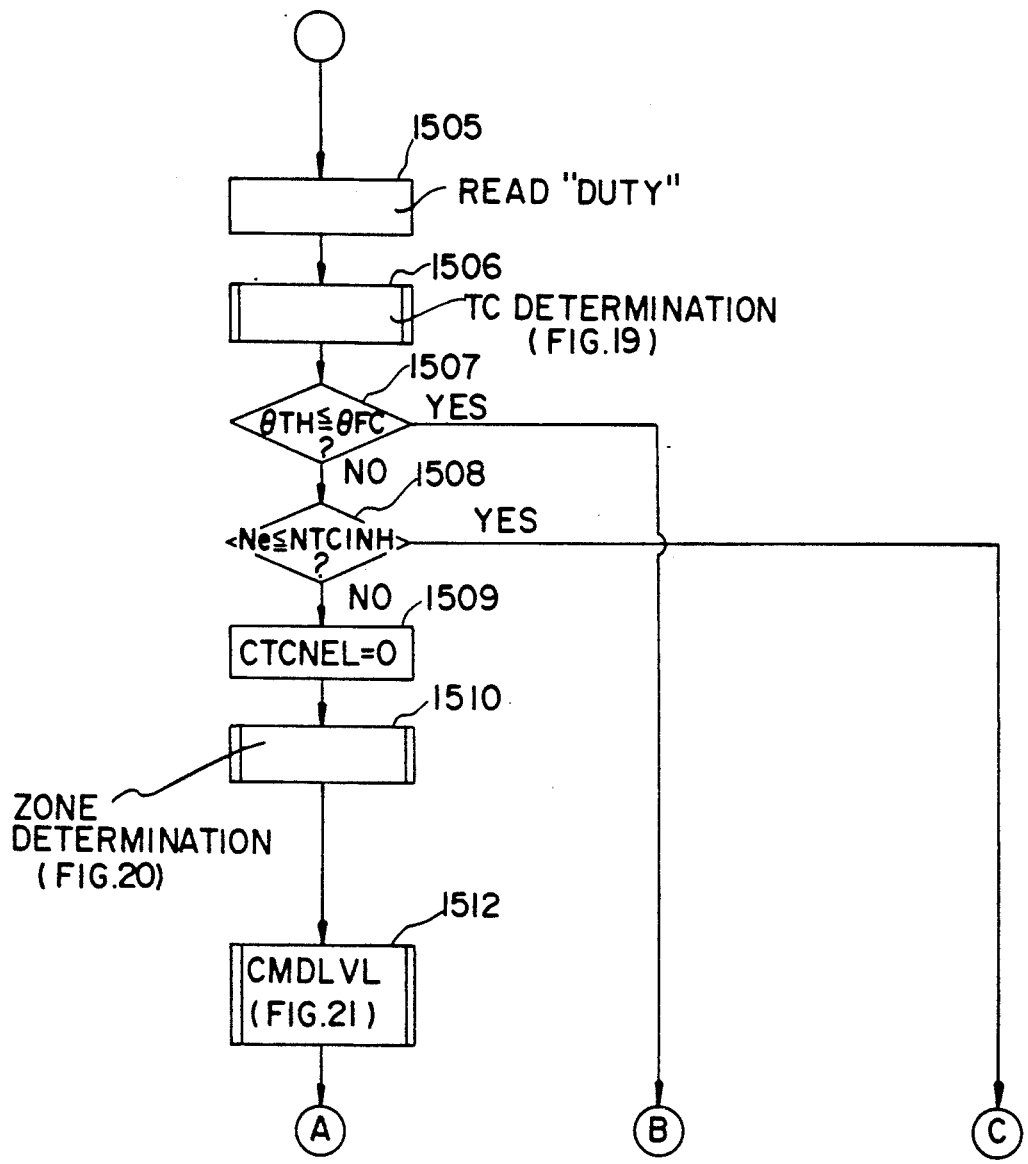
FIG. 18(a), 18(b) and 18(c) present different portions of a flow chart of a program for executing driving wheel slip control.
Figure 18B:
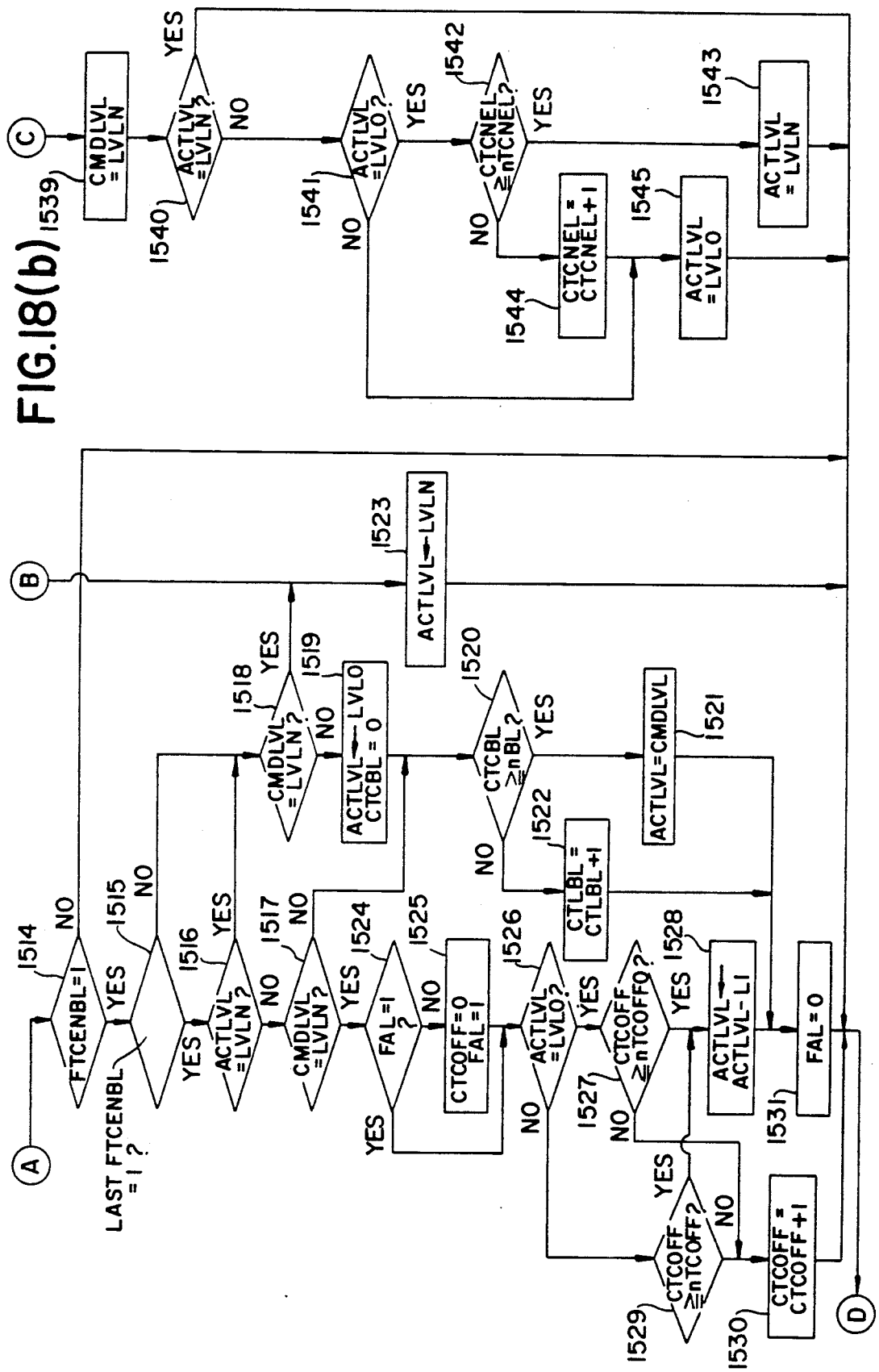
Figure 18C:
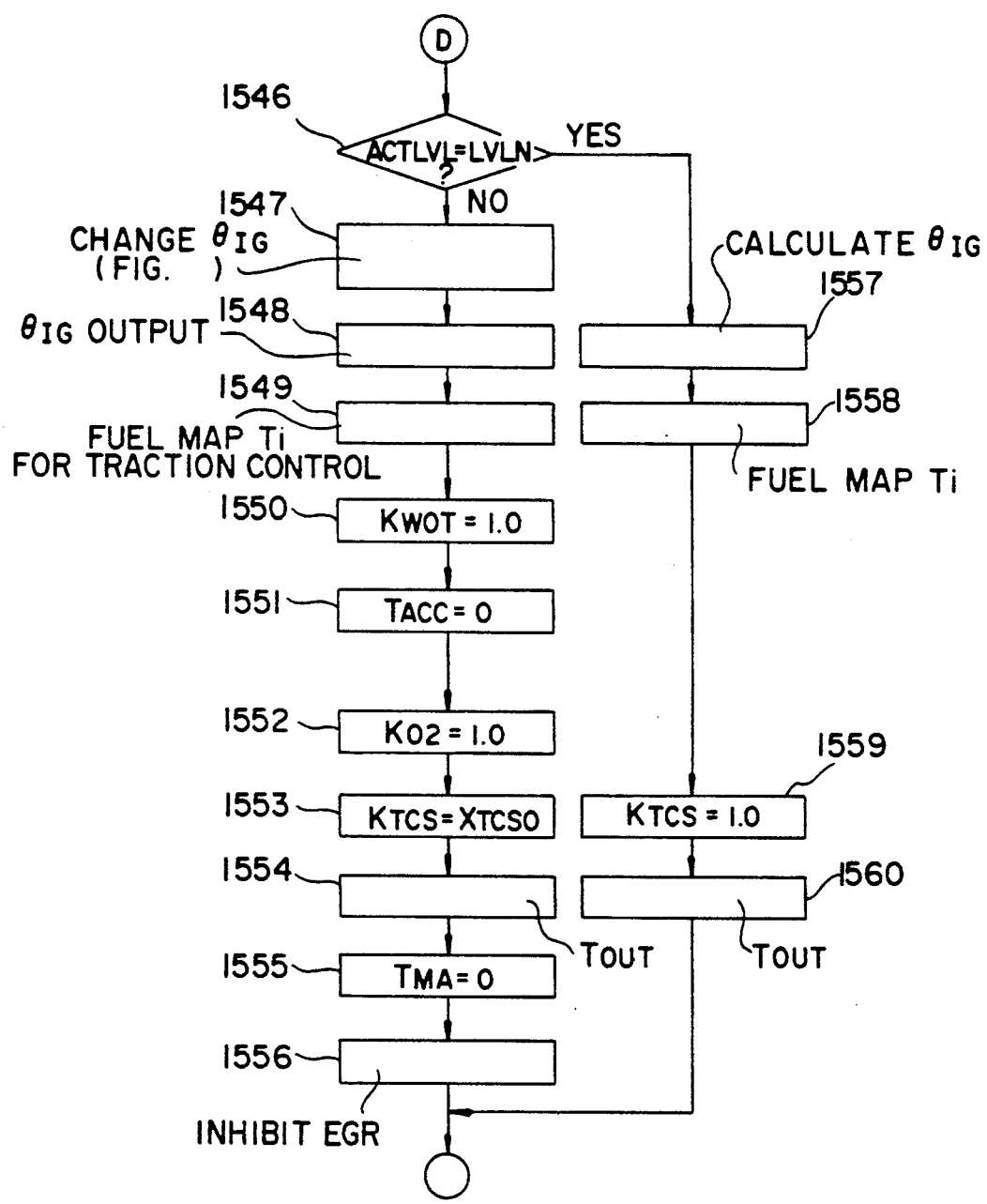

FIGS. 18a, 18b and 18c form a single flow chart of a program for effecting traction control in the ENG-ECU 105 by leaning the air-fuel ratio of an air-fuel mixture supplied to the engine 101 or carrying out fuel cut thereto depending upon the Duty Signal from duty signal calculating circuit 160, or carrying out both leaning and fuel cut. The present program is executed upon the generation of each TDC signal and is synchronized therewith.

Figure 19:
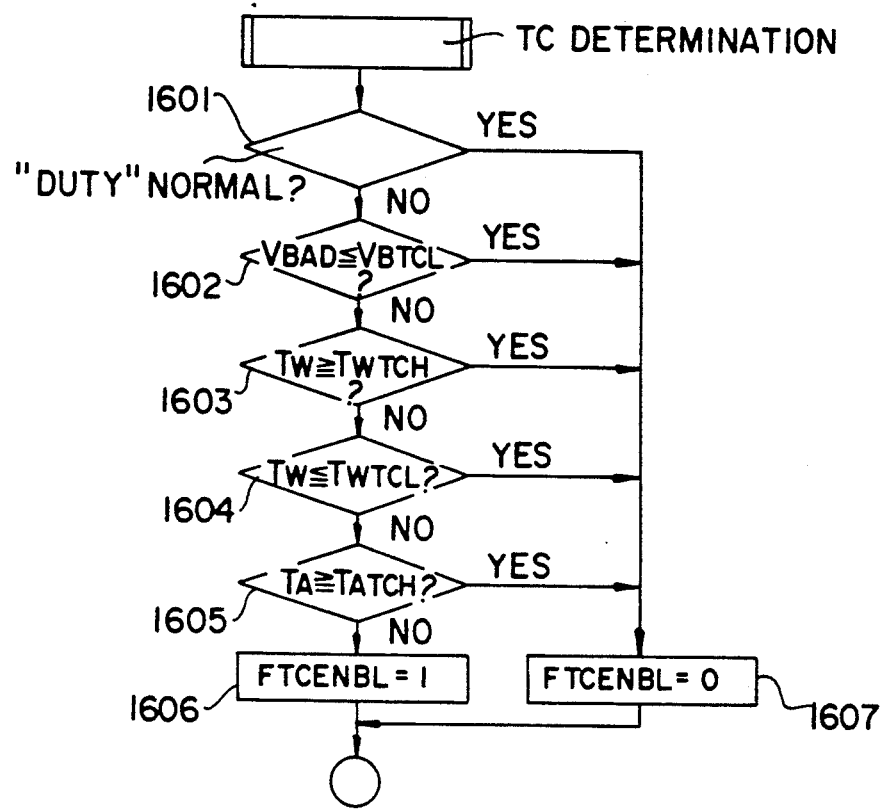
FIG. 19 is a flow chart of a subroutine for determining whether or not the traction control for reducing engine output should be executed, i.e. whether or not the TC condition is satisfied.

First, at Step 1505, the Duty Signal is read from TCS-ECU (the electronic control unit of the traction control system) 130. After the Duty Signal is read in Step 1505, the program proceeds to Step 1506. Step 1506 branches to a TC determination sub-routine illustrated in FIG. 19. In FIG. 19, Step 1601 of the TC determination sub-routine determines whether or not the Duty Signal is in the normal range. In other words, if the Duty Signal is not in the normal range, then traction control can be effected. If the Duty Signal is in the normal range then there is no need to effect traction control. Therefore if the answer in Step 1601 is NO, i.e. if the Duty Signal is not in the normal mode, it is then determined at Step 1602 whether or not the battery voltage $V_{BAD}$ ≦ a predetermined battery voltage $V_{BTCL}$. If the answer to Step 1602 is NO, i.e. if battery voltage $V_{BAD}$ is ≧ predetermined voltage $V_{BTCL}$, it is then determined at Step 1603 whether or not the engine coolant temperature $T_W$ is equal to or higher than a predetermined upper limit engine coolant temperature $T_{WTCH}$ (e.g. 115° C.). If the answer at Step 1603 is NO, i.e., if $T_W$ is less than $T_{WTCH}$, it is further determined at Step 1604 whether or not the engine coolant temperature is equal to or lower than a lower limit engine coolant temperature $T_{WTCH}$ (e.g. −15° C.). If the answer to Step 1604 is NO, i.e. if $T_W$ is greater than $T_{WTCL}$ then at Step 1606 the flag FTCENBL is set to a value of 1, followed by the termination of this subroutine.

If the answer to any of Steps 1601, 1602, 1603, or 1604 is YES, that is, if the Duty Signal is normal, $T_W$ ≧ $T_{WTCH}$, $T_W$ ≦ $T_{WTCL}$, or $V_{BAD}$ ≦ $V_{BTCL}$, it is judged that traction control should not be effected, i.e. the condition for effecting traction control is not satisfied, and flag FTCENBL is set to a value of 0 at Step 607, followed by the termination of the present sub-routine. This is because if the traction control is effected by leaning the air-fuel ratio of the air-fuel mixture supplied to the engine or carrying out a fuel cut to the engine, (a) in the case of a higher engine temperature ($T_W$ ≧ $T_{WTCH}$), the engine is not cooled by the supply of fuel and thus the engine may be damaged, (b) in the case of lower engine temperature ($T_W$ ≦ $T_{WTCL}$), mis-firing may occur, and (c) when $V_{BAD}$ < $V_{BTCL}$, the duty ratio signal will not be accurate.

On the other hand, if all of the answers to Steps 1601 through 1604 are NO, i.e. if the Duty Signal is not normal, $V_{BAD}$ > $V_{BTCL}$, $T_{WTCH}$ > $T_W$ > $T_{WTCL}$, it is judged that the condition for effecting the traction control is satisfied and the flag FTCENBL is set to a value of 1 at Step 1606, followed by the termination of the present sub-routine.

Returning to FIG. 18a, it is determined at Step 1507 whether or not the throttle valve is fully closed ($\Theta_{TH}$ ≦ $\Theta_{FC}$). If the answer to Step 1507 is YES, i.e. if the throttle valve is fully closed, then the program proceeds to branch B of the flow chart which is continued in FIG. 18b. If the throttle valve is fully closed, then in branch B in FIG. 18b, Step 1523 sets the actual level of traction control ACTLVL to a normal level LVLN so that no fuel cut or leaning occurs. After Step 1523, the program proceeds to branch D.

Figures 21, 22:
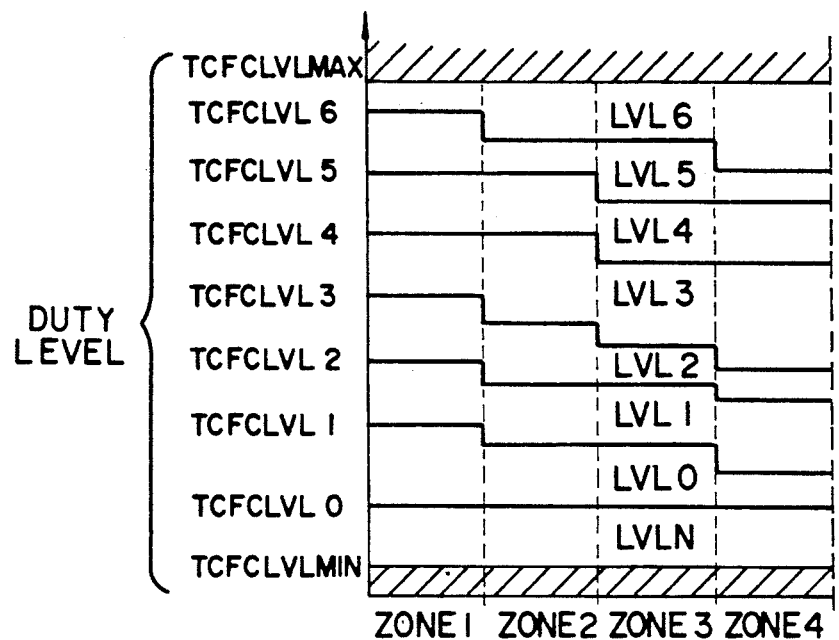
FIG. 21 is a diagram illustrating command levels for fuel cutting and fuel leaning based upon the zones of FIG. 20.
FIG. 22 is a map indicating the effect of each command level with respect to the cylinders of the engine.

However, if Step 1507 determines that the throttle valve 10 is not fully closed, i.e. $\Theta_{TH}$ > $\Theta_{FC}$, then the program proceeds to Step 1508. Step 1508 determines whether or not the engine rotational speed Ne is equal to or lower than a predetermined engine rotational speed $N_{TCINH}$ (e.g. 1,500 rpm). If the answer is YES, the program branches to branch C found in FIG. 18b. In other words, branch C operates during low speeds (for example, under 1,500 rpm). Therefore, if the engine speed Ne is less than or equal to the predetermined low engine speed $N_{TCINH}$, then at Step 1539 (in branch C) the command level of traction control CMDLVL is set to the normal level LVLN. The normal level LVLN is illustrated in FIG. 21. Comparing FIG. 21 with FIG. 22, it is understood that in the normal level LVLN, no fuel cut or fuel leaning takes place. In FIG. 22, normal level LVLN (no fuel cut and no lean) is represented by "0"s. The normal level LVLN is also illustrated in FIGS. 23(a)–23(c).

Next, Step 1540 determines if the actual level ACTLVL is equal to the normal level LVLN. If the answer is YES, i.e. the actual level is equal to the normal level in which there is NO traction control operating, then the program exits to branch D. If the answer to Step 1540 is NO, i.e. the actual level is not equal to the normal level, then Step 1541 determines whether or not the actual level ACTLVL is equal to level 0 (LVLO). If the answer to Step 1541 is YES, then Step 1542 determines whether or not the value CTCNEL≧nTCNEL. If the answer to Step 1541 is NO, i.e. ACTLVL is not equal to LVLO, then the program proceeds to Step 1545 in which the actual level ACTLVL is made equal to the level 0 (LVLO).

Figure 23:
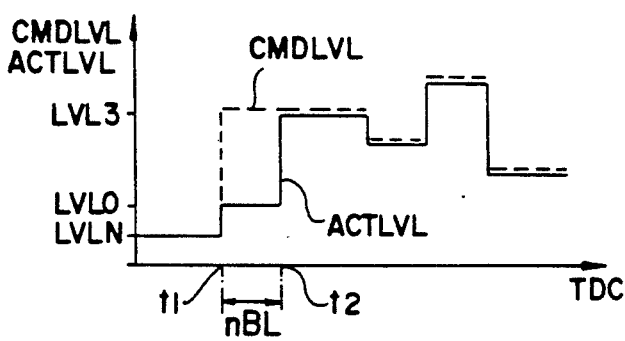
FIG. 23(a) is a diagram representing the actual operation of the traction control system in which all cylinders are leaned before a fuel cut operation.
FIG. 23(b) is a diagram similar to FIG. 10(a) wherein the restoring of fuel to an engine to which fuel has been cut is accomplished gradually.
FIG. 23(c) is a diagram similar to FIGS. 10(a) and 10(b), wherein traction control is stopped when the vehicle speed drops below a predetermined value.
Figure 23:
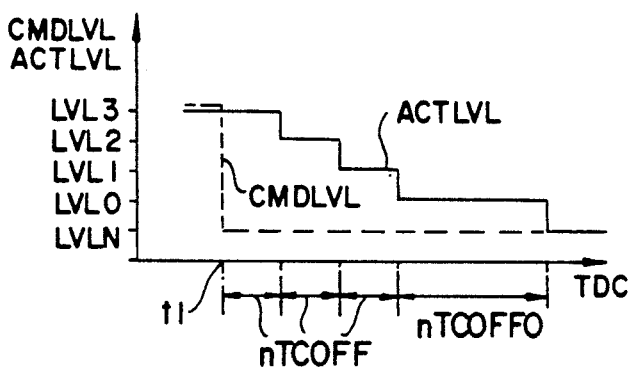
Figure 23:
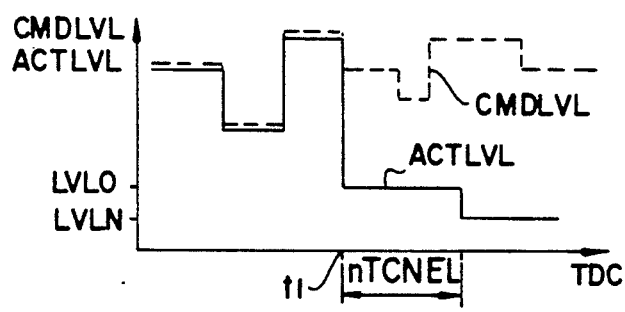

In other words, CTCNEL is a counter for counting leaning period in operating condition of low engine speed from the traction control region. Therefore, when traction control is in the active state which is executed in the steps below step 1509 in FIG. 18(*a*), the counter CTCNEL resets in step 1509. And when the fuel cutting occurs during the traction control region, the engine speed sometimes falls below a predetermined speed NTCINH which is determined in step 1508. In this situation, if the fuel cutting operation occurs before steps 1540 and 1541, the fuel cutting operation is stopped in order to avoid stalling the engine and fuel supplies are leaned until the counter CTCNEL counts up to nTCNEL by changing the flag ACTLVL into LVLO. FIG. 23(*c*) illustrates this operation. The timing tl in FIG. 23(*c*) describes the timing when the engine speed drops below the predetermined speed NTCINH.

With regard to Step 1542, if the answer is YES, i.e. if the counter CTCNEL reaches a value nTCNEL, then there is no need for traction control and the program proceeds to Step 1543 in which the actual level ACTLVL is set to be equal to the normal level LVLN. After Step 1543, the program proceeds to branch D.

If the answer to Step 1542 is NO, i.e. the counter CTCNEL has not yet reached the value nTCNEL, then the value CTCNEL is increased by 1. After Step 1544, Step 1545 changes the actual level ACTLVL to level 0 (LVL0). After Step 1545 the program proceeds to branch D.

Referring back to FIG. 18(*a*), the discussion above regarding branch C concerns low speed engine operation, for example less than 1,500 rpm. Further, in Step 1508, if the answer is NO, i.e. the engine speed Ne is greater than $N_{TCINH}$ (e.g. 1,500 rpm) then the program advances to Step 1509. In Step 1509, the value of counter CTCNEL is set to 0.

Figure 20:
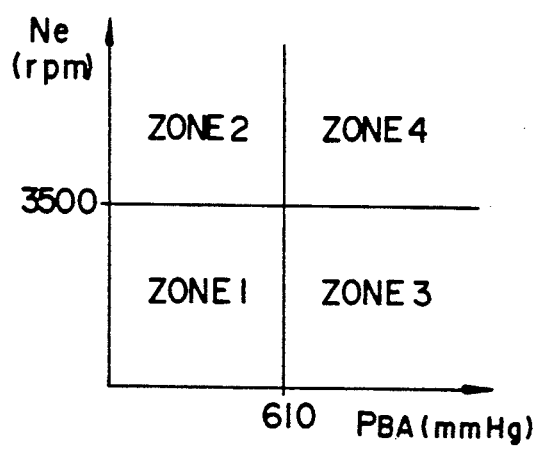
FIG. 20 is a zone diagram for comparing engine speed with engine load.

Next, Step 1510 determines the particular zone in which the engine is operating based upon engine speed and load, in accordance with FIG. 20. Specifically, as illustrated in FIG. 20, the Y-axis represents the engine speed (Ne) in rpm, while the X-axis represents the load as shown by the pressure in the intake manifold as shown, Pi.e. the engineBA(mmHg). The example of FIG. 20 shows demarcation lines for engine speed at 3,500 rpm and for manifold pressure at 610 mmHg. Therefore, Zone 1 is an area of low speed and low load. Zone 2 represents a high speed, low load condition. Zone 3 is a low speed, high load condition. Further, Zone 4 is a high speed, high load condition. Based upon the engine speed and the manifold pressure, one of the above four zones is selected in Step 1510.

Next, Step 1512 selects the proper command level (in accordance with FIG. 21) based upon the zone (selected in Step 1510). In other words, the command level CMDLVL is determined in accordance with the table of FIG. 21. The command level CMDLVL goes from LVLN (which represents a normal level, no traction. control) to the highest level of control LVL 6 in which fuel to all cylinders is cut.

FIG. 22 is a map illustrating the effect of each command level with regard to the cylinders of the engine. This example employs a six cylinder engine. Of course, the same system may be used with a four cylinder engine, an eight cylinder engine, or an engine with any other number of cylinders. For example, in FIG. 22, the cylinder number is listed across the X-axis, and the command levels are listed on the Y-axis. As previously noted, the normal level LVLN is a level in which no traction control takes place. In other words, in LVLN, none of the cylinders are fuel cut, or are fuel leaned. The LVLN level is represented by all zeros. At LVLO, all six cylinders are leaned (L). At LVL 6, all six cylinders are fuel cut (F/C). At LVL 1, cylinder 1 is fuel cut and cylinders 2–6 are leaned. Accordingly, levels LVL 2 through LVL 5 each cut fuel to an additional cylinder, respectfully. Therefore, the table of FIG. 22 determines which cylinders are to be fuel cut and which cylinders are to be leaned based upon the command level determined in FIG. 21. In FIG. 18(*a*), after Step 1512, the program continues through branch A which continues in FIG. 18(*b*).

In FIG. 18(*b*), branch A continues to Step 1514 which determines whether or not the flag TC enable FTCENBL is equal to 1. If the answer is NO, i.e. FTCENBL does not equal 1, or m other words, if it equals 0, then the program steps down to branch D, which is continued in FIG. 18(*c*). If the answer to Step 1514 is YES, i.e. FTCENBL equals 1 (fuel cut may occur) then the program continues to Step 1515. Step 1515 determines whether or not the previous or last flag FTCENBL is equal to 1.

Step 1516 determines whether or not the actual level ATCLVL is equal to the normal level LVLN. If the answer to Step 1516 is YES, i.e. the actual level is the normal level in which no traction control occurs, then the program proceeds to Step 1518. Step 1518 determines whether or not the command level CMDLVL is equal to the normal level LVLN. If the answer is YES, i.e. the command level is set to the normal level, then the program proceeds to Step 1523 which sets the actual level ATCLVL at the normal level LVLN. If the answer to Step 1518 is NO, i.e. the command level is not equal to the normal level LVLN, the program proceeds to Step 1519. At Step 1519 the actual level ACTLVL is set to level 0, LVLO. Further, counter set to 0. Step 1519 leads to Step 1520 which determines whether or not CTCBL is greater than or equal to nBL. The value nBL corresponds to the total number of cylinders in the engine. If the answer is YES, then the program proceeds to Step 1521 which sets the actual level ACTLVL at the command level CMDLVL. After Step 1521, the program returns to the main stream and to Step 1531. If the answer to Step 1520 is NO, i.e. counter CTCBL has not reached the value nBL, the value CTCBL is increased by 1 at Step 1522. The program then continues to Step 1531.

Returning to Step 1516, if the answer is NO, i.e. the actual level ACTLVL is not equal to the normal level of LVLN, in other words, a fuel cut or lean operation has already occurred, the program proceeds to Step 1517. Step 1517 determines whether or not the command level CMDLVL is equal to the normal level LVLN. If the Answer is NO, i.e. the command level CMDLVL is not at the normal level LVLN (in other words, CMDLVL =LVL0-6), the program proceeds to Step 1520 which compares the cylinder number CTCBL with the total number of cylinders in the engine nBL. However, if the answer to Step 1517 is YES, i.e. the command level CMDLVL is equal to the normal level LVLN, then the program proceeds to Step 1524.

In Step 1524 it is determined whether or not the flag FAL equals 1. If the flag FAL equals 1, i.e. the flag represents the end of the traction control period, the answer is YES and the program proceeds to Step 1526. If the answer to Step 1524 is NO, i.e. the flag FAL does not equal 1, this indicates that it is the beginning of the traction control (the flag FAL equals 0), then the program proceeds to Step 1525 which sets a counter CTCOFF to be equal to 0, CTCOFF corresponds to the ending of the traction control for the command level, and sets the flag FAL equal to 1. The program continues at Step 1526 which determines whether or not the actual level ACTLVL is equal to the level 0 (LVLO). If the answer is YES, i.e. all cylinders are leaned (as shown in FIG. 22), and the program continues to Step 1527. If the answer to Step 1526 is NO, i.e. the actual level ACTLVL is some other level besides LVLO, the program proceeds to Step 1529.

This particular portion of the program describes FIG. 23(b), in which the command level CMDLVL turns OFF and the actual level ACTLVL gradually reduces to the level LVLN in order to reduce shock of restoring torque to the engine. At Step 1529, it is determined whether or not the value CTCOFF is≧nT-COFF. If the answer is NO, then the program proceeds to Step 1530 which increments the value CTCOFF by 1. The program then proceeds to branch D. If the answer to Step 1529 is YES, i.e. if enough time has elapsed to avoid engine shock, then the program proceeds to Step 1528.

Returning to Step 1526, if the answer is YES, i.e. the actual ACTLVL is equal to LVLO, the program proceeds to Step 1527. Step 1527 determines whether or not the value CTCOFF is ≧nTCOFFO. If the answer is YES, as illustrated in FIG. 23b, the program proceeds to Step 1528 in which the actual level ACTLVL is decremented by 1 level. Thus, as shown in FIG. 23b, the actual level ACTLVL returns to the normal level LVLN. From this point the program continues to Step 1531 which sets the flag FAL at 0 to be ready for the beginning of the next traction control operation. Returning to Step 1527, if the answer is NO, i.e. if all cylinders are in leaning condition for at least one time, then the program proceeds to Step 1530 in which the value CTCOFF is incremented by 1. After Steps 1530 and 1531, the program proceeds to branch D.

Figure 24:
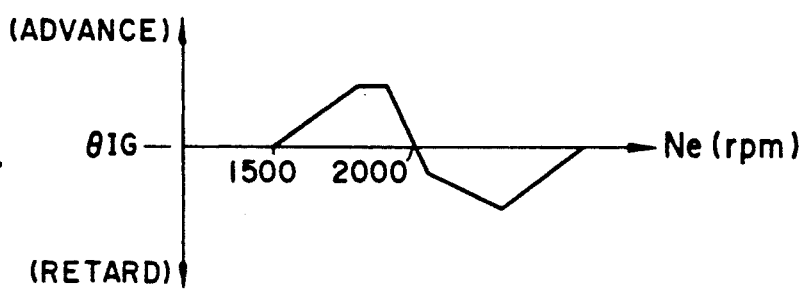
FIG. 24 is a graph representing a correction angle for ignition timing $\Theta_{IG}$ based upon engine speed.

Branch D is shown in FIG. 18c. Step 1546 determines if the actual level ACTLVL is equal to the normal LVLN. If the answer is YES, i.e. the actual level is at the normal level and thus no traction control is operating, then the program proceeds to Step 1557. In Step 1557, the ignition timing $\Theta_{IG}$ is calculated. Next, Step 1558 determines the proper full amount from the fuel map (Ti). At this point, the normal fuel amount is set for normal running. Next, Step 1559 sets the leaning coefficient $K_{TCS}=1.0$, which is a nominal value. Then, Step 1560 calculates the time period for outputting the fuel $T_{OUT}$. After Step 1560, the program loop has finished. If the answer to Step 1546 is NO, i.e. the actual level ACTLVL does not equal the normal level LVLN, the program proceeds to Step 1547. Step 1547 changes the ignition timing $\Theta_{IG}$ according to FIG. 24. Specifically, in FIG. 24, the X-axis represents engine speed (Ne) and the Y-axis represents the ignition angle $\Theta_{IG}$, in which the ignition angle advances in the up direction and retards in the down direction. The graph in FIG. 24 provides for a correction angle of the ignition during traction control operation. Next, Step 1548 outputs the ignition angle $\Theta_{IG}$ calculated in Step 1547. Next, Step 1549 calculates the amount of fuel to be injected according to fuel map Ti for the traction control operation. Next, Step 1550 sets a coefficient value $K_{WOT}=1.0$ as a rich value for high loads. Step 1551 sets an acceleration enrichment value $T_{ACC}=0$, and Step 1552 sets an ignition control coefficient $K_{02}=1.0$. Thus Steps 1550, 551 and 552 all reset operating coefficients. Next, Step 1553 sets the leaning coefficient $K_{TCS}$ equal to the value $X_{TCSO}$ for shifting the air/fuel ratio to around 18 to prevent burning. Next, Step 1554 sets the output period of the fuel injection $T_{OUT}$. Next, Step 1555 sets asynchronous enrichment value during acceleration $T_{MA}=0$ so that the enrichment is stopped during traction control, which is necessary for accurate arrangement of the air/fuel ratio and the following Step 1556 inhibits the EGR (exhaust gas recirculation). The program loop is finished and next returns to the beginning.

FIGS. 23(a), 23(b) and 23(c) represent the actual operation of the traction control system. FIG. 23a represents the condition in which the traction control is beginning. In other words, between times $t_1$ and $t_2$ the actual level ACTLVL does not meet the command level CMDLVL. Specifically, it is noted that the command level increases directly from LVLN to LVL3. The actual level of traction control increases to LVLO for a period nBL before jumping up to LVL3. As stated above, the traction control system first goes to LVL0 to lean all cylinders before providing a fuel cut to any cylinder. In FIG. 23(a), LVL3 cuts fuel to cylinders 1, 3 and 5. All six cylinders are leaned first (see FIG. 22) in order to prevent the adhesion fuel in the intake port to further prevent increased temperature in the catalytic converter, as well as an increased level of unburned hydrocarbons.

FIG. 23(b) as described above illustrates the operation in which the command level CMDLVL immediately changes from LVL3 to LVLN. In order to reduce shock of immediately increased engine torque, the actual level ACTLVL of the traction control is decreased gradually.

Further, FIG. 23(c) illustrates an instance (described above with regard to steps 1508, 1540, 1541 and 1545) when the engine speed drops below a predetermined speed (such as 1500 rpm) and thus the traction control operation is stopped as quickly as possible. The actual level ACTLVL is reduced to LVLO for a period in TCNEL and then further reduced to LVLN to completely stop all traction control operations.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A driving wheel slip control system for a motor vehicle, comprising:

a driving wheel speed sensor means for sensing the speed of a driving wheel of the vehicle and outputting a driving wheel speed;

excess slip sensing means for sensing an excess slip of a driving wheel based on said driving wheel speed;

fuel supply control means for controlling the amount of fuel supplied to a multi-cylinder engine of the vehicle, said fuel supply control means having an engine output reducing means for reducing said engine output in response to an occurrence of said excess slip;

a three-way catalytic converter for performing a purging of HC, CO and NOx components in the exhaust gases from said engine, said engine output reducing means including, (a) leaning means for leaning an air-fuel ratio of an air-fuel mixture supplied to all cylinders of said multicylinder engine except a fuel cut-off cylinder, and (b) fuel cut-off means for cutting-off the fuel supply to a specified number of cylinders upon the sensing of an excess slip by said excess slip sensing means.

2. The driving wheel slip control system of claim 1, wherein excess slip sensing means further includes means for outputting a slip value corresponding to the amount of excess slip of said driving wheel, and said specified number of cylinders, for which fuel is to be cut by said fuel cut-off means, is determined in response to said slip value.

3. The driving wheel slip control system of claim 2, wherein said engine output reducing means further includes means for causing said fuel supply means to repeat alternate fuel cut and fuel leaning in a manner such that fuel supply is stopped for a first predetermined period of time, when said excessive slip state is detected by said excess slip sensing means.

4. The driving wheel slip control system of claim 2, said engine output reducing means further including, (a) first leaning means for leaning the air-fuel ratio of an air-fuel mixture supplied to all cylinders of the engine, when said slip value exceeds a first predetermined slip value, (b) fuel cut-off means for cutting off fuel to said specified number of cylinders subsequent to the operation of said first leaning means, said specified number of cylinders being determined in response to the magnitude of said slip value, when said slip value exceeds a second predetermined slip value, wherein said second predetermined slip value is greater than said first predetermined slip value.

5. The driving wheel slip control system of claim 4, wherein said engine output reducing means further includes second leaning means for additional leaning of the air-fuel ratio of an air-fuel mixture supplied to at least a cylinder other than said specified fuel-cut cylinders, when said slip value exceeds said second predetermined slip value.

6. The driving wheel slip control system of claim 5, wherein said first and second leaning means increase leaning of the air-fuel ratio as said slip value increases.

7. The driving wheel slip control system of claim 1, wherein said engine output reducing means further including first leaning counting means ($C_{TCBL}$) for counting a leaning fuel supply period after detection of an excess slip condition from said excess slip sensing means, said first leaning counting means being carried out to terminate said count before said fuel cut-off means begins to operate.

8. The driving wheel slip control system of claim 7 wherein said leaning fuel supply period corresponds to the number of engine cylinders.

9. The driving wheel slip control system of claim 1, wherein said engine output reducing means also includes second leaning counting means for counting a leaning fuel supply period after detection of a change from excess slip to no slip.

10. A driving wheel slip control system as recited in claim 9, wherein said leaning fuel supply period corresponds to the number of engine cylinders.

11. The driving wheel slip control system of claim 1, wherein said fuel cut-off means includes an alternating means for causing said fuel supply control means to alternate fuel cut and fuel supply, such that fuel is cut-off for a first predetermined period of time, and fuel supply is then effected for a second predetermined period of time, when said slip value exceeds said second predetermined slip value, said second predetermined slip value being greater than said first predetermined slip value.

12. The driving wheel slip control system of claim 11, wherein when said slip value exceeds said second predetermined slip value during said second predetermined period of time, said fuel supply control means supplies fuel to said engine in an amount more lean than the air-fuel ratio of said leaning means.

13. The driving wheel slip control system of claim 12, wherein said amount of fuel supplied to said engine for said second predetermined period of time is set by a fuel decremental value determined in dependence on an operating condition of said engine, when said slip value exceeds said second predetermined slip value.

14. The driving wheel slip control system of claim 13, wherein said fuel decremental value is dependent upon at least one of the rotational speed of said engine and pressure in an intake passage of said engine.

15. The driving wheel slip control system of claim 11, wherein the ratio between said first predetermined period of time and said second predetermined period of time is set to a value dependent upon an operating condition of said engine, when said slip value exceeds said second predetermined slip value.

16. The driving wheel slip control system of claim 15, wherein the ratio between said first predetermined period of time and said second predetermined period of time is set to a value dependent upon at least one of the rotational speed of said engine and pressure in an intake manifold.

17. The driving wheel slip control system of claim 11, wherein the ratio between said first predetermined period of time and said second predetermined period of time is set to a value dependent upon a slip state of said driving wheel, when the slip value exceeds said second predetermined slip value.

18. The driving wheel slip control system of claim 17, wherein the ratio between said first predetermined period of time and said second predetermined period of time is set to a value dependent upon at least one of the slip value and differential slip value.

19. The driving wheel slip control system of claim 11, wherein said fuel supply control means repeats alternate fuel cut and fuel supply when said slip value exceeds said second predetermined slip value after said slip value has a magnitude which is smaller than said second predetermined slip value, for less than a third predetermined period of time.

20. The drive wheel slip control system of claim 1, wherein said fuel cut-off means includes,
a first control means for repeating alternate fuel cut and fuel supply, such that fuel cut is effected for a first predetermined period of time, and fuel supply is effected for a second predetermined period of time, when a first slip state in a continuous slipping state, is determined to be in effect, wherein said first slip state is a slipping state into which at least one driving wheel shifts immediately after no excess slip or less excess slip is detected for less than a fourth predetermined period of time; and
a second control means for effecting a continuous fuel cut to the engine for a third predetermined period of time longer than said first predetermined period of time, when a second slip state is determined to be in effect, wherein said second slip state is a slipping state into which said at least one driving wheel shifts immediately after a stable condition having less slip is detected for more than a fourth predetermined period of time.

21. The drive wheel slip control system of claim 1, wherein said fuel cut-off means includes,
a first control means for repeating alternate fuel cut and fuel supply, such that fuel cut is effected for a first predetermined period of time, and fuel supply is effected for a second predetermined period of time, when a first slip state, in a continuous slipping state is determined to be in effect, wherein said first slip state is a slipping state into which at least one driving wheel shifts immediately after no excess slip or less slip is detected for less th an a fourth predetermined period of time; and
a second control means for effecting a continuous fuel cut to the engine so long as a second slip state is determined to be in effect, wherein said second slip state is a slipping state into which said at least one driving wheel shifts immediately after a stable condition having less slip is detected for more than a fourth predetermined period of time.

22. The driving wheel slip control system of claim 1, wherein said fuel supply control means includes a reducing means associated with said excess slip sensing means, and operable when said slip value returns to a value below said excess slip, for reducing output from said engine to a value more rich than the airfuel ratio of said leaning means, when no excess slip conditions are present immediately after said slip value has returned to a value below said excess slip.

23. The driving wheel slip control system of claim 22, wherein said reducing means comprises ignition timing retarding means for retarding ignition timing in said engine.

24. The driving wheel slip control system of either claim 22 or 23, wherein said reducing means operates when the rotational speed of said engine is higher than a predetermined value immediately after said slip value returns to a value below said excess slip value.

25. The driving wheel slip control system of one either claim 22 or 23, wherein said reducing means operates for a fifth predetermined period of time after said slip value returns to a value below said second predetermined slip value.

26. The driving wheel slip control system of claim 1, wherein said fuel supply control means further including;

an air fuel ratio correcting means (KWOT, TACC, KO2 and TMA) for correcting said air-fuel ratio in response to engine operating parameters; and
an inhibiting means for inhibiting said air-fuel ratio correcting means when said excess slip condition is detected.

27. The driving wheel slip control system of claim 1, wherein said fuel supply control means further includes;
a low engine speed detecting means for detecting low engine speed; and
a compulsory leaning means for supplying leaning air-fuel ratio when said low engine speed is detected during said cut-off means being effected.

28. The driving wheel slip control system of claim 1, wherein said fuel supply control means further includes;
inhibiting means (FTCENBL) for inhibiting said engine output reducing means in response to at least one of engine coolant temperature and intake air temperature during the operation of said engine output reducing means; and
fuel cut recovering means, responsive to said inhibiting means, for leaning all cylinders before returning said cylinders to normal operation.

29. A driving wheel slip control system for a motor vehicle, comprising:
a driving wheel speed sensor means for sensing the speed of a driving wheel of the vehicle and outputting a driving wheel speed;
excess slip sensing means for sensing an excess slip of driving wheel based on said driving wheel speed; and
fuel supply control means for controlling the amount of fuel supplied to an engine of the vehicle, including
(a) engine operating parameter detecting means for detecting an engine operating parameter, and
(b) engine output reducing means for reducing engine output in response to said excess slip, and engine output reduction amount being in response to said engine operating parameter.

30. A driving wheel slip control system as recited in claim 29, wherein said engine operating parameter detecting means detects intake manifold pressure (PBA) and engine speed (Ne).

31. A driving wheel slip control system for a motor vehicle, comprising:
a driving wheel speed sensor means for sensing the speed of a driving wheel of the vehicle and outputting a driving wheel speed;
excess slip sensing means for sensing an excess slip of said driving wheel based on said driving wheel speed;
fuel supply control means for controlling the amount of fuel supplied to an engine of the vehicle, including
(a) engine operating parameter detecting means for detecting an engine operating parameter, and
(b) engine output reducing means for reducing engine output in response to said excess slip value in a manner such that a reduction ratio being in response to said engine operating parameter; and
excess slip sensing reference value changing means for changing said reference value for sensing said excess slip in response to said engine operating parameter.

32. A driving wheel slip control system as recited in claim 31, wherein said engine operating parameter detecting means detects intake manifold pressure (PBS) and engine speed (Ne).

* * * * *